(12) United States Patent
Liu et al.

(10) Patent No.: US 11,595,943 B2
(45) Date of Patent: Feb. 28, 2023

(54) OUTER CODING SCHEMES IN DOWNLINK CONTROL INFORMATION

(71) Applicant: QUALCOMM Incorporated, San Diego, CA (US)

(72) Inventors: Le Liu, Fremont, CA (US); Alberto Rico Alvarino, San Diego, CA (US); Kazuki Takeda, Tokyo (JP); Amer Catovic, San Diego, CA (US); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/170,324

(22) Filed: Feb. 8, 2021

(65) Prior Publication Data

US 2021/0250904 A1    Aug. 12, 2021

Related U.S. Application Data

(60) Provisional application No. 62/975,042, filed on Feb. 11, 2020.

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0055* (2013.01); *H04W 72/042* (2013.01); *H04W 72/0466* (2013.01)

(58) Field of Classification Search
CPC ............. H04W 72/005; H04W 72/042; H04W 72/0466; H04L 5/0055
See application file for complete search history.

(56) References Cited

U.S. PATENT DOCUMENTS 6,560,206 B1 * 5/2003 Naden ................. H04L 12/5601
                                                                370/310.1
10,355,819 B2 * 7/2019 Yeo .................... H03M 13/6306
(Continued)

FOREIGN PATENT DOCUMENTS

WO    WO-2005109728 A1    11/2005

OTHER PUBLICATIONS

International Search Report and Written Opinion—PCT/US2021/017221—ISA/EPO—dated May 31, 2021.
(Continued)

*Primary Examiner* — Michael J Moore, Jr.
(74) *Attorney, Agent, or Firm* — Holland & Hart

(57) ABSTRACT

Methods, systems, and devices for wireless communications are described. A base station may configure an outer coded block which a user equipment (UE) may implement to recover an unsuccessfully decoded transmission. The base station may send, to the UE, downlink control information (DCI) indicating an outer coding scheme for the group of data blocks (e.g., a first data block and a second data block). The UE may monitor for the data blocks and the outer coded block. The UE may decode the data blocks based on the outer coded block and the outer coding scheme. In some examples, the outer code block may be made up of a combination of the first and second data blocks. The UE may use the combination of the outer coded block and one of the data blocks to decode an unsuccessfully decode data block.

29 Claims, 20 Drawing Sheets

(51) Int. Cl.
*H04W 72/044* (2023.01)
*H04W 72/04* (2023.01)

(56) References Cited

U.S. PATENT DOCUMENTS

| | | |
|---|---|---|
| 2003/0207696 A1 | 11/2003 | Willenegger et al. |
| 2010/0260266 A1 | 10/2010 | Gholmieh et al. |
| 2018/0262303 A1* | 9/2018 | Jia .................. H04L 1/1819 |
| 2019/0165882 A1 | 5/2019 | You et al. |
| 2019/0305887 A1* | 10/2019 | Jang ................ H04L 1/0045 |
| 2020/0007161 A1* | 1/2020 | Dikarev ............ H03M 13/6356 |
| 2020/0259600 A1* | 8/2020 | Cao .................. H04W 72/1289 |
| 2021/0226732 A1* | 7/2021 | Yeo .................. H03M 13/6306 |
| 2021/0250904 A1* | 8/2021 | Liu .................. H04W 72/005 |
| 2021/0306981 A1* | 9/2021 | Liu .................. H04L 1/1896 |

OTHER PUBLICATIONS

SIEMENS: "Proposal for Outer Coding for MBMS", 3GPP TSG GERAN Meeting #19, Tdoc GP-040716, 3GPP Draft; GP-040716_MBMS_Outer_Coding_ Proposal, 3rd Generation Partnership Project (3GPP), Mobile Competence Centre; 650, Route Des Lucioles; F-06921 Sophia-Antipolis Cedex; France, vol. TSG GERAN, No. Cancun; Mexico, Apr. 19-23, 2004, pp. 1-14, Apr. 16, 2004, Apr. 16, 2004 (Apr. 16, 2004), XP050010724, [retrieved on Apr. 16, 2004] Sections 1-6.

* cited by examiner

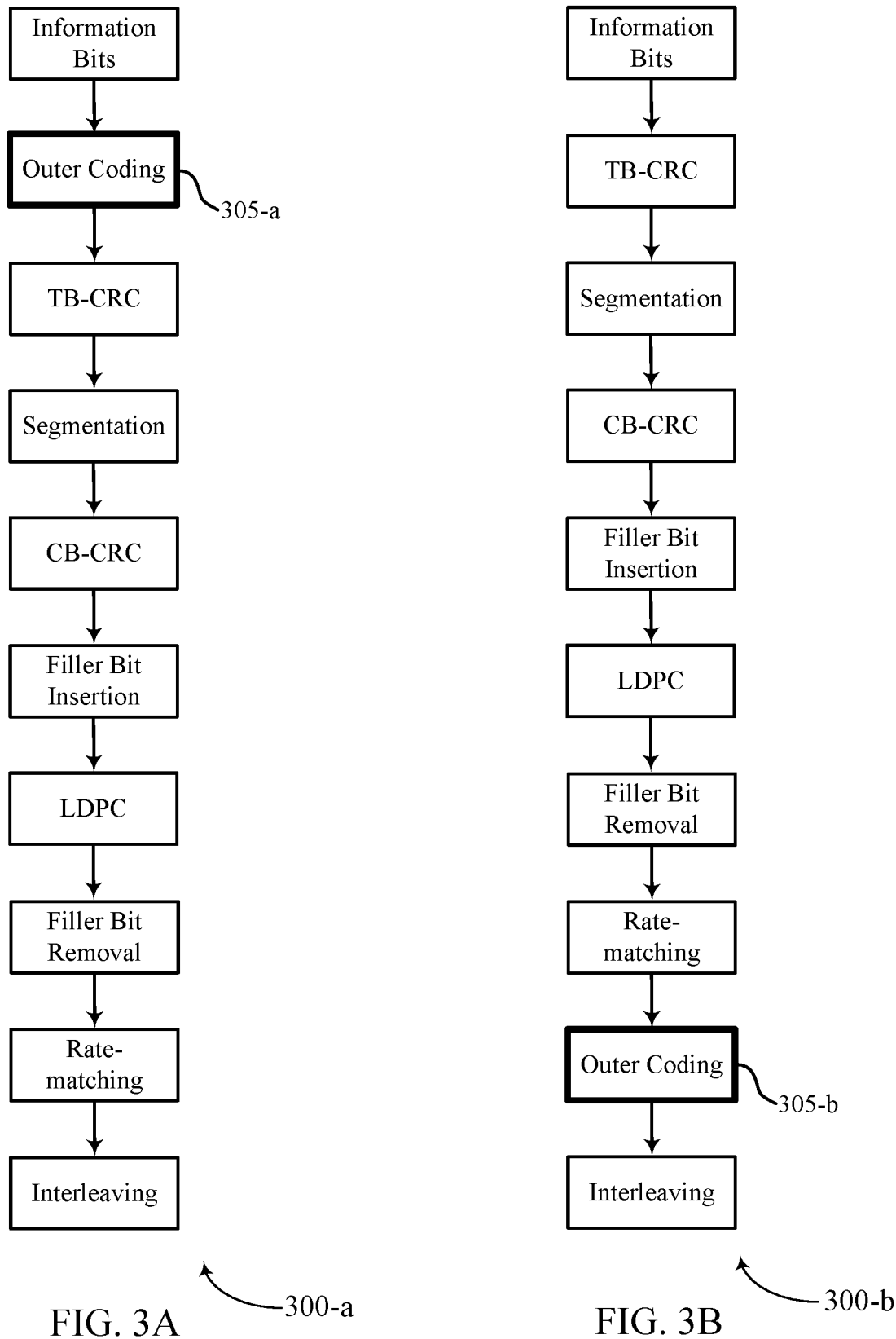

OUTER CODING SCHEMES IN DOWNLINK CONTROL INFORMATION

CROSS REFERENCE

The present application for patent claims the benefit of U.S. Provisional Patent Application No. 62/975,042 by Liu et al., entitled "OUTER CODING SCHEMES IN DOWNLINK CONTROL INFORMATION," filed Feb. 11, 2020, assigned to the assignee hereof, and expressly incorporated by reference herein.

FIELD OF TECHNOLOGY

The following relates generally to wireless communications and more specifically to outer coding schemes in downlink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a UE is described. The method may include receiving downlink control information on a wireless channel, the downlink control information indicating an outer coding scheme for a set of data blocks associated with a multicast transmission or a broadcast transmission, monitoring the wireless channel for the set of data blocks and an outer coded block based on the set of data blocks and the outer coding scheme, and decoding the set of data blocks based on the outer coding scheme and the outer coded block.

An apparatus for method of wireless communication at a UE is described. The apparatus may include a processor, memory coupled with the processor, and instructions stored in the memory. The instructions may be executable by the processor to cause the apparatus to receive downlink control information on a wireless channel, the downlink control information indicating an outer coding scheme for a set of data blocks associated with a multicast transmission or a broadcast transmission, monitor the wireless channel for the set of data blocks and an outer coded block based on the set of data blocks and the outer coding scheme, and decode the set of data blocks based on the outer coding scheme and the outer coded block.

Another apparatus for method of wireless communication at a UE is described. The apparatus may include means for receiving downlink control information on a wireless channel, the downlink control information indicating an outer coding scheme for a set of data blocks associated with a multicast transmission or a broadcast transmission, monitoring the wireless channel for the set of data blocks and an outer coded block based on the set of data blocks and the outer coding scheme, and decoding the set of data blocks based on the outer coding scheme and the outer coded block.

A non-transitory computer-readable medium storing code for method of wireless communication at a UE is described. The code may include instructions executable by a processor to receive downlink control information on a wireless channel, the downlink control information indicating an outer coding scheme for a set of data blocks associated with a multicast transmission or a broadcast transmission, monitor the wireless channel for the set of data blocks and an outer coded block based on the set of data blocks and the outer coding scheme, and decode the set of data blocks based on the outer coding scheme and the outer coded block.

In some examples of the method, apparatuses, and non-transitory computer-readable medium described herein, decoding the set of data blocks further may include operations, features, means, or instructions for decoding the outer coded block and a first data block of the set of data blocks, and performing, based on a success of decoding the outer coded block and the first data block, an outer decoding procedure for a second data block of the set of data blocks using the outer coded block and the first data block.

Some examples of the method, apparatuses, and non-transitory computer-readable medium described herein may further include operations, features, means, or instructions for performing the outer decoding procedure for the second data block may be further based on a determination that an initial decoding of the second data block was unsuccessful.

In some examples of the method, apparatuses, and non-transitory computer-readable medium described herein, performing the outer decoding procedure for the second data block may include operations, features, means, or instructions for removing one or more padding bits from a combination of the outer coded block and the first data block.

In some examples of the method, apparatuses, and non-transitory computer-readable medium described herein, performing the outer decoding procedure for the second data block may include operations, features, means, or instructions for combining a log-likelihood ratio of the outer coded block with a log-likelihood ratio of the first data block to obtain a log-likelihood ratio of the second data block, and decoding the second data block based on the combining.

In some examples of the method, apparatuses, and non-transitory computer-readable medium described herein, performing the outer decoding procedure for the second data block may include operations, features, means, or instructions for combining the decoded outer coded block with the decoded first data block to obtain the second data block.

Some examples of the method, apparatuses, and non-transitory computer-readable medium described herein may further include operations, features, means, or instructions for transmitting an acknowledgement message or a negative acknowledgment message based on a success of the outer decoding procedure.

In some examples of the method, apparatuses, and non-transitory computer-readable medium described herein, each data block of the set of data blocks may include operations, features, means, or instructions for a transport block (TB), a codeblock (CB), or a CB group (CBG).

In some examples of the method, apparatuses, and non-transitory computer-readable medium described herein, the first data block and the second data block may be CBs or CB groups from a same TB.

In some examples of the method, apparatuses, and non-transitory computer-readable medium described herein, the first data block and the second data block may be CBs or CB groups from different TBs.

In some examples of the method, apparatuses, and non-transitory computer-readable medium described herein, the first data block and the second data block may be CBs from a different TB.

Some examples of the method, apparatuses, and non-transitory computer-readable medium described herein may further include operations, features, means, or instructions for receiving a downlink control information transmission including an indication of the outer coded block.

In some examples of the method, apparatuses, and non-transitory computer-readable medium described herein, the indication of the outer coded block may include operations, features, means, or instructions for a hybrid automatic repeat request process identifier indicating the outer coded block, a redundancy version identifier indicating the outer coded block, CB group transmission information indicating the outer coded block; or, and a dedicated field indicating the outer coded block.

Some examples of the method, apparatuses, and non-transitory computer-readable medium described herein may further include operations, features, means, or instructions for receiving a radio resource control message configuring a format for indicating the outer coded block in the downlink control information, and identifying the outer coded block based on the radio resource control message and the downlink control information.

Some examples of the method, apparatuses, and non-transitory computer-readable medium described herein may further include operations, features, means, or instructions for transmitting a UE capability message indicating support for outer coding by the UE.

A method of wireless communications at a base station is described. The method may include transmitting downlink control information on a wireless channel, the downlink control information indicating an outer coding scheme for a set of data blocks associated with a multicast transmission or a broadcast transmission, transmitting on the wireless channel the set of data blocks and an outer coded block based on the set of data blocks and the outer coding scheme, and monitoring for feedback information for the set of data blocks based on the outer coding scheme and the outer coded block.

An apparatus for wireless communications at a base station is described. The apparatus may include a processor, memory coupled with the processor, and instructions stored in the memory. The instructions may be executable by the processor to cause the apparatus to transmit downlink control information on a wireless channel, the downlink control information indicating an outer coding scheme for a set of data blocks associated with a multicast transmission or a broadcast transmission, transmit on the wireless channel the set of data blocks and an outer coded block based on the set of data blocks and the outer coding scheme, and monitor for feedback information for the set of data blocks based on the outer coding scheme and the outer coded block.

Another apparatus for wireless communications at a base station is described. The apparatus may include means for transmitting downlink control information on a wireless channel, the downlink control information indicating an outer coding scheme for a set of data blocks associated with a multicast transmission or a broadcast transmission, transmitting on the wireless channel the set of data blocks and an outer coded block based on the set of data blocks and the outer coding scheme, and monitoring for feedback information for the set of data blocks based on the outer coding scheme and the outer coded block.

A non-transitory computer-readable medium storing code for wireless communications at a base station is described. The code may include instructions executable by a processor to transmit downlink control information on a wireless channel, the downlink control information indicating an outer coding scheme for a set of data blocks associated with a multicast transmission or a broadcast transmission, transmit on the wireless channel the set of data blocks and an outer coded block based on the set of data blocks and the outer coding scheme, and monitor for feedback information for the set of data blocks based on the outer coding scheme and the outer coded block.

Some examples of the method, apparatuses, and non-transitory computer-readable medium described herein may further include operations, features, means, or instructions for configuring the outer coded block by combining a first data block and a second data block of the set of data blocks.

In some examples of the method, apparatuses, and non-transitory computer-readable medium described herein, configuring the outer coded block further may include operations, features, means, or instructions for combining a rate matched encoded version of the first data block with a rate matched encoded version of the second data block to obtain a rate matched encoded version of the outer coded block.

In some examples of the method, apparatuses, and non-transitory computer-readable medium described herein, a cyclic redundancy check of the set of data blocks may be added per source of the set of data blocks and coded.

In some examples of the method, apparatuses, and non-transitory computer-readable medium described herein, monitoring for feedback information for the set of data blocks may include operations, features, means, or instructions for receiving an acknowledgement message or a negative acknowledgment message based on a success of an outer decoding procedure based on the outer coding scheme.

Some examples of the method, apparatuses, and non-transitory computer-readable medium described herein may further include operations, features, means, or instructions for transmitting a downlink control information transmission including an indication of the outer coded block.

In some examples of the method, apparatuses, and non-transitory computer-readable medium described herein, the indication of the outer coded block may include operations, features, means, or instructions for a hybrid automatic repeat request process identifier indicating the outer coded block, a redundancy version identifier indicating the outer coded block, CB group transmission information indicating the outer coded block; or, and a dedicated field indicating the outer coded block.

Some examples of the method, apparatuses, and non-transitory computer-readable medium described herein may further include operations, features, means, or instructions for transmitting a radio resource control message configuring a format for indicating the outer coded block in the downlink control information.

Some examples of the method, apparatuses, and non-transitory computer-readable medium described herein may further include operations, features, means, or instructions for receiving a UE capability message indicating support for outer coding by the UE.

In some examples of the method, apparatuses, and non-transitory computer-readable medium described herein, the UE capability message may include operations, features, means, or instructions for an indication of the support for outer coding per component carrier of a set of component carriers; or, and an indication of the support for outer coding of one or more data rates for outer coding or non-outer coding.

In some examples of the method, apparatuses, and non-transitory computer-readable medium described herein, receiving the UE capability message further may include operations, features, means, or instructions for identifying the UE as part of a grouping of a set of UEs based on the support for outer coding by the UE, and transmitting a multicast signal to the grouping of the set of UEs.

Some examples of the method, apparatuses, and non-transitory computer-readable medium described herein may further include operations, features, means, or instructions for transmitting the multicast signal to one or more UEs not indicating support for outer coding.

BRIEF DESCRIPTION OF THE DRAWINGS

FIGS. 3A and 4B illustrate examples of coding schemes that support outer coding in downlink control information in accordance with aspects of the present disclosure.

FIGS. 4A and 4B illustrate examples of coding schemes that support outer coding in downlink control information in accordance with aspects of the present disclosure.

DETAILED DESCRIPTION

The described techniques relate to improved methods, systems, devices, and apparatuses that support outer coding schemes in downlink control information (DCI). In some examples, a base station may send multicast transmissions to multiple wireless devices (e.g., user equipment (UEs)). If any of the UEs fail to successfully decode the transmission, that UE may send a negative acknowledgment (NACK) to the base station. In response to receiving the NACK, the base station may retransmit the multicast transmission to the entire group of UEs. Retransmissions to a group of UEs may increase overhead signaling and may be inefficient if a majority of the UEs in the group have already correctly decoded the multicast transmission. Thus, an increase of multicast retransmissions may affect throughput and quality of service (QoS). To avoid these inefficiencies, improved coding methods to increase the probability that a UE recipient of a multicast transmission will correctly decode a multicast transmission the first time is needed. Thus, the number of NACKs and multicast retransmissions is reduced.

A base station may apply an outer code scheme in a physical layer to improve the reliability for NR multicast (or broadcast) transmissions and reduce the HARQ feedback/retransmission probability. The base station may configure and send, to the UE, an outer coded block which the UE may implement to recover an unsuccessfully decoded transmission. The base station may send, to the UE, a DCI indicating an outer coding scheme for the group of data blocks (e.g., a first data block and a second data block). The UE may monitor for the data blocks and the outer coded block. The UE may decode the data blocks based on the outer coded block and the outer coding scheme. In some examples, the outer code block may be made up of a combination of the first and second data blocks. In a case where the first data block is unsuccessfully decoded, the UE may use the combination of the outer coded block and the second data block to recover and successfully decode the first data block.

Particular aspects of the subject matter described herein may be implemented to realize one or more advantages. One implementation may enable a network, such as a base station, to indicate an outer coding scheme in a DCI message to a UE. Such indication may enable techniques for coding data blocks at the physical layer, which may result in improved system reliability and more efficient communications (e.g., decreased latency in the system), among other advantages.

Aspects of the disclosure are initially described in the context of wireless communications systems. An additional wireless communications system, coding schemes, and a process flow are then provided to illustrate aspects of the disclosure. Aspects of the disclosure are further illustrated by and described with reference to apparatus diagrams, system diagrams, and flowcharts that relate to outer coding schemes in downlink control information.

Figure 1:
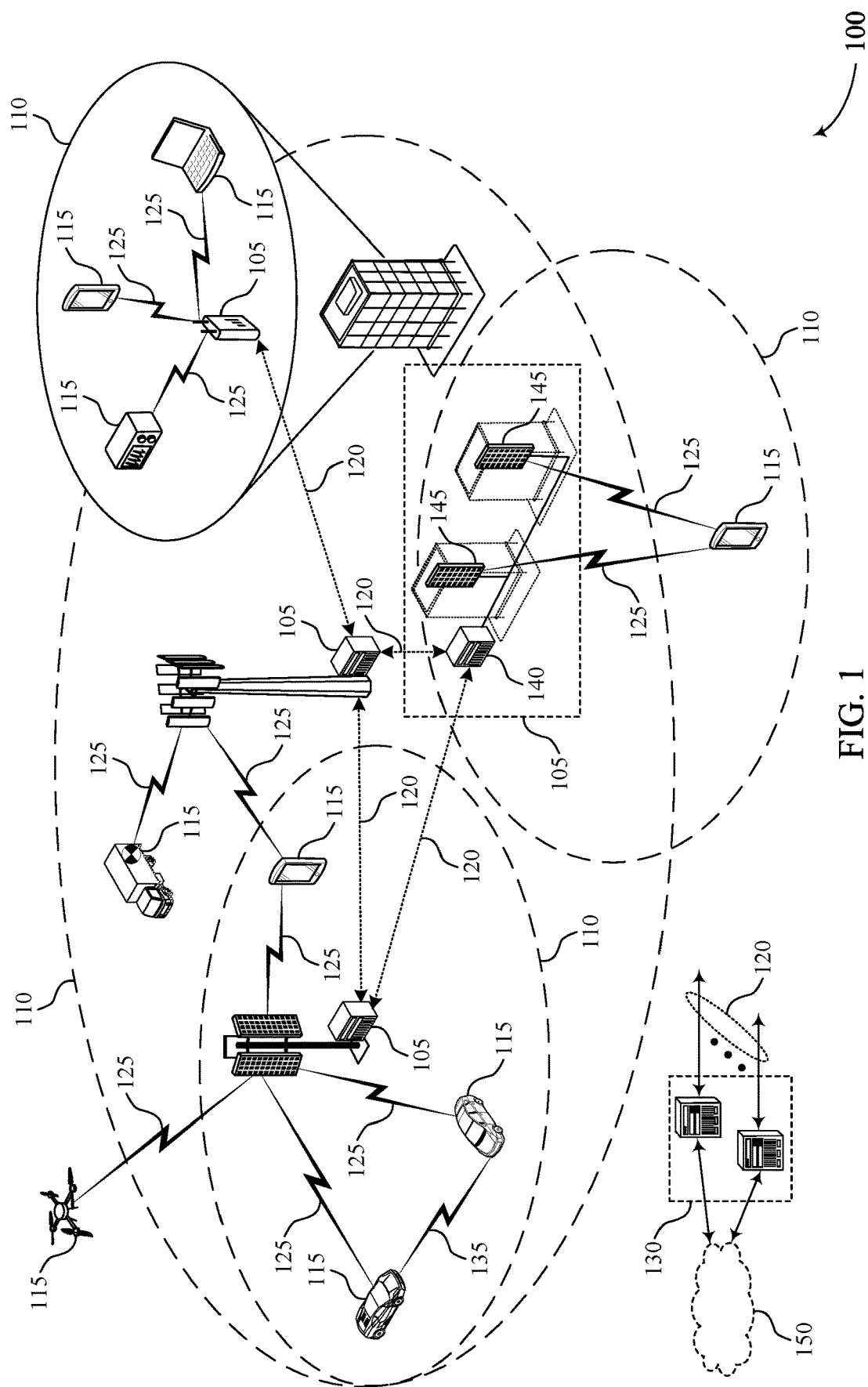
FIG. 1 illustrates an example of a system for wireless communications that supports outer coding schemes in downlink control information in accordance with aspects of the present disclosure.

FIG. 1 illustrates an example of a wireless communications system 100 that supports outer coding schemes in downlink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Base station 105 may send, to UE 115, a DCI indicating an outer coding scheme for a group of data blocks (e.g., TBs, CBs, code block groups CBGs). The UE 115 may monitor for the data blocks and an outer coded block based on the data blocks and the outer coding scheme. The UE 115 may decode the data blocks based on the outer coded block and the outer coding scheme.

Figure 2:
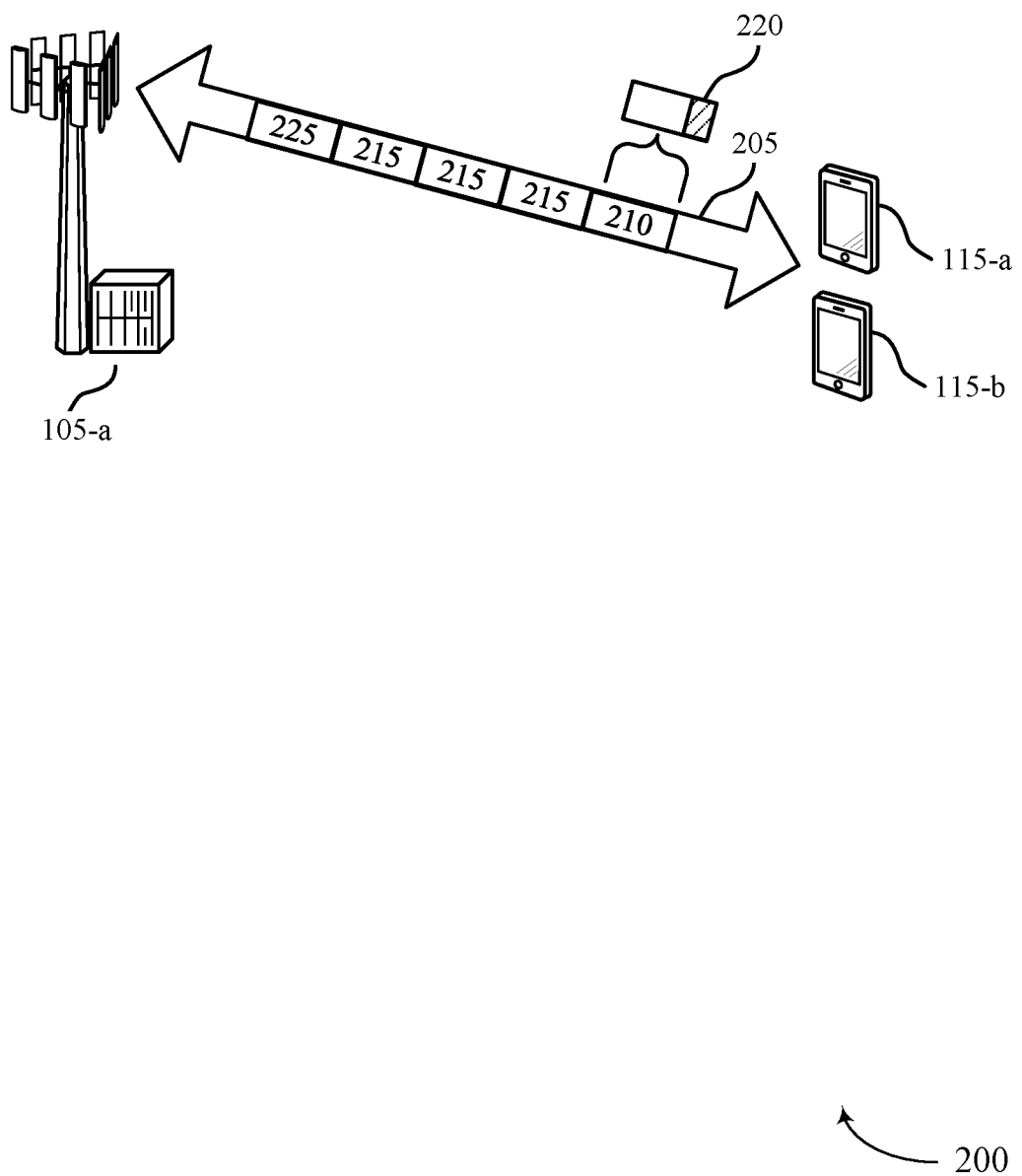
FIG. 2 illustrates an example of a wireless communications system that supports outer coding schemes in downlink control information in accordance with aspects of the present disclosure.

FIG. 2 illustrates an example of a wireless communications system 200 that supports outer coding schemes in downlink control information in accordance with aspects of the present disclosure. In some examples, wireless communications system 200 may implement aspects of wireless communications system 100 and may include UE 115-*a*, UE 115-*b*, and base station 105-*a*, which may be examples of UEs 115 and a base station 105 described with reference to FIG. 1.

In some examples, a base station 105 may communicate with one or more UEs 115 via a broadcast communication link 205. For example, base station 105-*a* may communicate with UE 115-*a* and UE 115-*b* using broadcast communication link 205. The base station 105 may broadcast, or multicast, control information 210 corresponding to a set of data blocks 215 prior to or in connection with a broadcast or multicast of those data blocks 215 to UE 115-*a* and UE 115-*b*. In some cases, two or more data blocks 215 may be encoded together according to an outer coding scheme (e.g., an XOR with or without weighting factors, polynomial, or other operation) at the PHY layer to generate an outer coded block 225 as a repair code block. This outer coded block 225 may be transmitted with the set of data blocks 215. More than one outer coded block may be generated. Each data block 215 and outer coded block 225 may be a transport block (TB), a code block (CB) within a or a code block group (CBG).

When one of the data blocks 215 is not successfully decoded by UE 115-*a* or UE 115-*b*, that data block 215 can be recovered by reversing the outer coding process using a combination of a successfully received data block 215 and the successfully received outer coded block 225. Thus, the inclusion of the outer coded block 225 with the data blocks 215 in the broadcast or multicast transmission may increase the probability that each of UE 115-*a* and UE 115-*b* receives the data block 215. Because HARQ feedback may be sent only for negative acknowledgment of broadcast or multicast information, this use of outer coding at the physical layer may reduce the number of HARQ feedback transmissions at the UEs 115 as well as the number of retransmissions at the base station 105, thereby increasing the efficiency of broadcast or multicast transmissions.

In some cases, the control information 210 may include an indication of which blocks in the broadcast or multicast transmission are data blocks 215 and which blocks are outer coded blocks 225 according to the outer coding scheme. For example, the control information 210 may be downlink control information (DCI) transmitted to UE 115-a, UE 115-b, or both. The control information 210 may include an indication 220 that identifies and distinguishes outer coded block 225 from data blocks 215 in the broadcast or multicast transmission.

In some cases, the indication 220 may be included in an existing DCI field of the control information 210. For example, base station 105-a may use the HARQ process ID, or new data indicator (NDI) to identify the outer coded block 225. The HARQ process ID field may have four bits, indicating up to 16 HARQ process IDs. In some cases, if base station 105-a includes fewer than 16 HARQ process IDs in control information 210, base station 105-a may reserve the remaining bits or entries to identify the outer coded block 225 (e.g., indicate the codeword for the data block 215). Base station 105-a may use separate fields of the HARQ process ID, the NDI, or both to identify the outer coded block 225. Additionally or alternatively, if the HARQ process ID and the NDI bit are jointly coded, base station 105-a may use the joint coding to identify the outer coded block 225 (e.g., a combination of the HARQ process ID bits and the NDI bit). In other cases, base station 105-a may use radio resource control (RRC) signaling to configure a set of HARQ process ID combinations, and base station 105-a may indicate one or more of the combinations corresponding to the outer coded block 225 in the control information 210.

Additionally or alternatively, base station 105-a may use redundancy version (RV) bits in the control information 210 to identify the outer coded block 225. For example, the RV field may include two bits (e.g., RV=0, 1, 2, 3), which the base station 105-a may use to indicate information corresponding to data blocks 215 or outer coded blocks 225 being scheduled for broadcast or multicast transmission. Base station 105-a may indicate that a scheduled block is a data block 215 by setting the RV bits to 0 (e.g., if RV=0, the data block 215 has not been coded). Base station 105-a may indicate one of three outer code combinations for an outer coded block 225 by setting the RV bits for the outer coded block equal to 1, 2, or 3 (e.g., if RV=1, 2, or 3, the block is an outer coded block 225 and has been coded according to process or scheme associated with that RV value). For example, different values of the RV bits may indicate different weighting factors or different processes for generating the outer codes (e.g., if the outer coding process includes an XOR operation, each value of RV bits may indicate performing the XOR operation using a different weighting or combination of data blocks 215 or source symbols from the data blocks 215).

In some cases, base station 105-a may use a CB group transmission information (CBGTI) field of control information 210 to indicate if one or more CBG outer codes are used for data block 215. For example, the bitmap size of the CBGTI field in the control information 210 may be dependent on the CBG number, such as a maximum number of CBGs. Base station 105-a may use a larger bitmap for the CBGTI field to account for the addition of outer coded blocks 225, such as outer coded CBGs. That is, base station 105-a may use remaining bits in the CBGTI field to indicate one or more outer coded blocks 225 (e.g., outer coded CBGs) to distinguish the outer coded blocks 225 from the data blocks 215 (e.g., regular CBGs) used as inputs to produce the outer coded blocks 225.

In some cases, the indication 220 may be included in a new DCI field of the control information 210. For example, the new DCI field may indicate, in addition to an identification of the outer coded block(s) 225, a predefined code combination (e.g., specified by RRC signaling or a predetermined value). If the new field is two bits, base station 105-a may indicate four outer code combinations. These code indications may indicate different weighting factors or different processes for generating the outer codes (e.g., if the outer coding process includes an XOR operation, each outer code combination may indicate performing the XOR operation using a different weighting or combination of data blocks 215 or source symbols from the data blocks 215)

In some examples, UEs 115 may monitor a channel (e.g., a physical downlink control channel (PDCCH)) for data blocks 215. For example, UE 115-a and UE 115-b may monitor a PDCCH for data block 215. However, UE 115-a and UE 115-b may be different UE types, and thus operate according to different capabilities and operating parameters. UE 115-a, for example, may have no problem decoding a data block 215 without relying on outer coded block 225, while UE 115-b may rely on the outer coded block 225 (e.g., due to poor internal environment at UE 115-b) to recover the same data block 215. In some cases, to reduce power consumption at UE 115-a (e.g., associated with unnecessary monitoring), base station 105-a may include a separate radio network temporary identifier (RNTI) (e.g., a broadcast or multicast RNTI), or may use one bit in a DCI message (e.g., the control information 210), to indicate if the data block 215 is coded. In some cases, the time window associated with an uplink ACK (e.g., dl-DataToUL-ACK) may correspond to the coding of the data block 215.

The techniques described herein may allow a base station 105 to transmit information, such as a DCI message or other control information 210, indicating an outer coding scheme for one or more data blocks 215 of a broadcast or multicast transmission to one or more UEs 115 via a. The outer coding scheme may improve signaling overhead by reducing the number of HARQ feedback transmissions and correspond retransmissions of the data blocks 215.

FIGS. 3A and 3B illustrate examples of coding schemes 300-a and 300-b that support techniques for outer coding in the PHY layer for wireless communications systems in accordance with aspects of the present disclosure. In some examples, coding schemes 300-a and 300-b may implement aspects of wireless communications systems 100 and/or 200. For instance, coding schemes 300-a and 300-b may each illustrate the order in which a base station 105 or a UE 115 codes a block of data, such as a data block 215 described with reference to FIG. 2. Although FIGS. 3A and 3B illustrate an example coding process, the process may not be limited to the steps described herein.

In some cases, the base station 105 may generate coded bits from information bits in the PHY layer. The outer codes 305 may be applied across a TB. For example, as illustrated in FIG. 3A, the base station 105 may use the information bits to generate the outer code 305-a before the cyclic redundancy check (CRC) for the TB. For example, if there are two TBs (e.g., TB1 and TB2), the base station 105 may use information bits from the two TBs to generate outer code 305-a (e.g., TBOuterCode=TB1+TB2). In some cases, the base station 105 may perform a CRC for each TB (e.g., source TBs TB1 and TB2 and coded TB TBOuterCode). The CRC bits may be added for each source TB and coded TB. In some examples, the two TBs may be different sizes. For example, TB2 may be smaller than TB1. In such cases, the base station 105 may not add bits (e.g., may add 0), or may add a predefined number of random bits to TB2 until it is the same size as TB1 to generate the coded TB. The CRC bits are added for TB1, TB2, and coded TB respectively. Same or different number of CRC bits (e.g., longer CRC bits) may be used for source TBs and coded TB.

The base station 105 may perform segmentation for large TBs. The base station 105 may divide the TB into multiple CBs and perform a CRC for each CB. Subsequently, the base station 105 may determine to insert padding bits, perform low-density parity-check (LDPC) coding of the data, then remove the filler bits. In some cases, as illustrated in FIG. 3B, the base station 105 may apply the outer code 305-b after rate-matching. For example, the base station 105 may add together rate-matched output bits of each TB (e.g., RateMatchedTB1+RateMatchedTB2) for outer coding 305-b. In some cases, a rate-matched TB may include one or more CBs or CBGs. The base station 105 may interleave the CBs and map the CBs into resource elements. The base station 105 may then transmit the coded TBs to a UE 115.

In some cases, when the UE 115 receives the TBs, the UE 115 may use the outer coding 305-a or 305-b to recover an incorrectly decoded TB. For example, if the UE 115 receives TB1 and TB2 and TBOuterCode, but does not decode TB1 or TB2 correctly, the UE 115 may combine TBOuterCode to TB1 or TB2 to recover the one that was incorrectly decoded. The UE 115 may perform a similar operation for the rate-matched TBs. In some examples, if the TBs are coded according to outer coding 305-a, the UE 115 may decode the TBs separately (e.g., because they are coded at the information bit level). The UE 115 may firstly decode each TB, including source TB (TB1 and TB2) and coded TB, respectively. By checking the CRC per TB, TB1 and coded TB may be detected correctly but TB2 may not be detected correctly. The UE may use the detected TB1 and coded TB to repair TB2. In other examples, if the TBs are coded according to outer coding 305-b, the UE 115 may not decode the TBs separately (e.g., because the UE 115 may recover the TB prior to decoding). For example, the UE 115 firstly decodes the source TB (e.g., TB1 and TB2), if TB1 is decoded correctly with CRC passed but TB2 is not, the UE 115 may not need to decode the TBOuterCode itself but descramble the log-likelihood ratios (LLRs) rate matched bits of RateMatchedTB1 by using the LLR of coded TB (e.g., TBOuterCode) to estimate the LLR of RateMatchedTB2 and decode TB2, i.e., LLR_RateMatchedTB1+LLR_RateMatchedTB.

The UE 115 may send an ACK message for TBs that are decoded correctly (e.g., with or without using the coded TB). The UE 115 may send a NACK message for TBs that are incorrectly decoded and may not be recovered (e.g., more than one TB or coded TB are incorrectly decoded). If the UE 115 decodes the coded TB (e.g., TBOuterCode) correctly or incorrectly, the UE 115 may or may not send an ACK or a NACK message. Therefore, there is no need to allocate PUCCH resource for HARQ-ACK feedback for the coded TB. There is also no need to allocate HARQ ID for the coded TB.

Figures 4A, 4B:
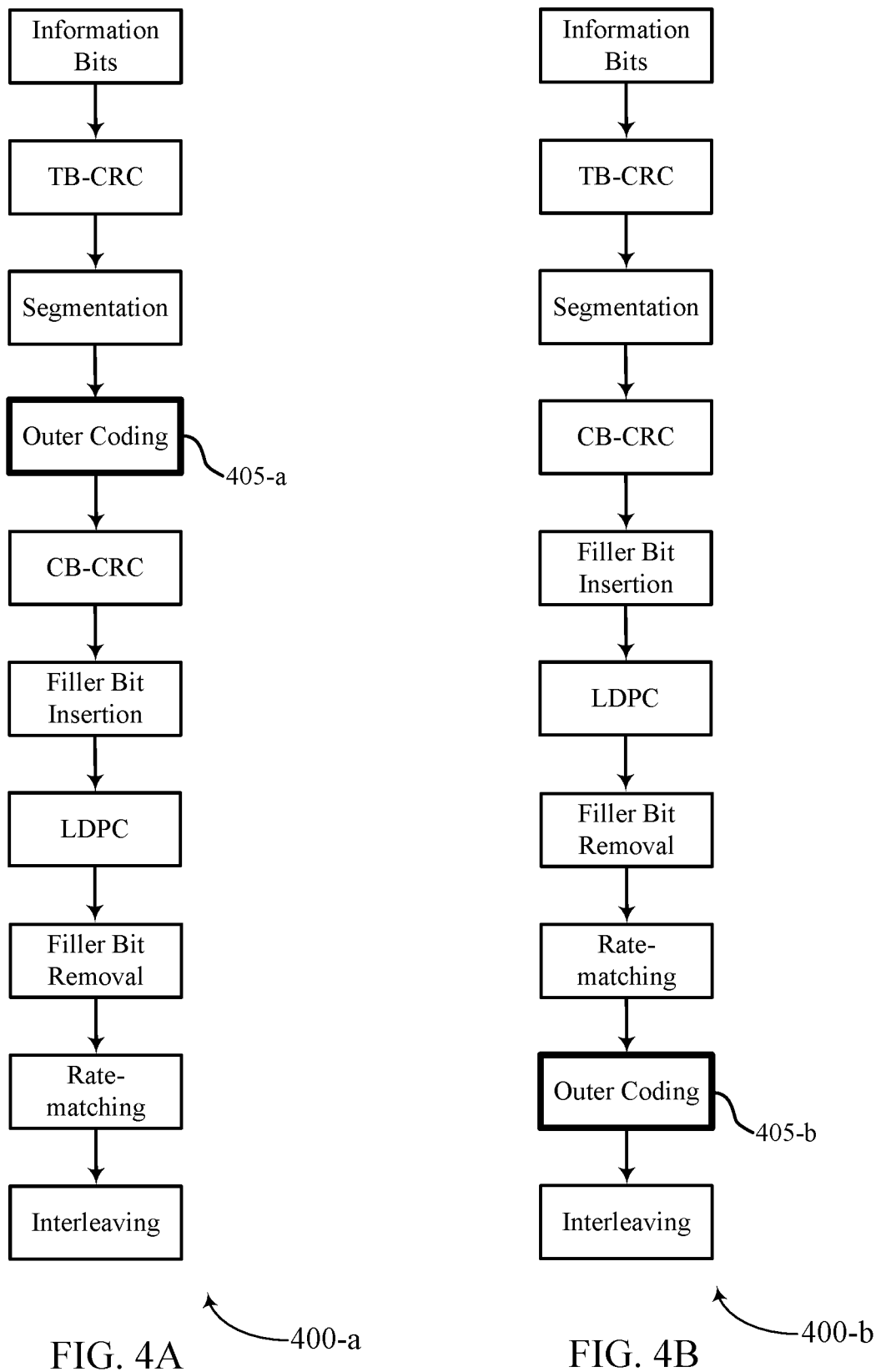

FIGS. 4A and 4B illustrate examples of coding schemes 400-a and 400-b that support techniques for outer coding in the PHY layer for wireless communications systems in accordance with aspects of the present disclosure. In some examples, coding schemes 400-a and 400-b may implement aspects of wireless communications systems 100 and/or 200 and coding schemes 300-a and 300-b. For instance, coding schemes 400-a and 400-b may each illustrate the order in which a base station 105 or a UE 115 code a block of data, such as a data block 215 described with reference to FIG. 2. Although FIGS. 4A and 4B illustrate an example coding process, the process may not be limited to the steps described herein.

In some examples, the coding schemes 400-a and 400-b may be similar to the coding schemes described with reference to FIGS. 3A and 3B. For example, the base station 105 may generate coded bits from information bits in the PHY layer. The outer codes 405 may be applied across a CB. For example, the base station 105 may segment the TB into multiple CBs. In such examples, if no CBG is configured, there may be one bit for feedback (e.g., HARQ-ACK) per TB (e.g., instead of one for each CB). In some cases, as illustrated in FIG. 4A, the base station 105 may apply the outer code 405-a before coding and rate-matching. Thus, the CRC bits are added for each source CB and coded CB to form the outer code 405-a (e.g., within a TB: CBOuterCode1=CB1_TB1+CB2_TB1, CBOuterCode2=CB1_TB2+CB2_TB2, and among TBs: CBOuterCode1=CB1_TB1+CB1_TB2, CBOuterCode2=CB2_TB1+CB2_TB2). If the CBs in different TBs vary in size, the base station 105 may not add bits (e.g., may add 0 header), may add a predefined number of random bits to a smaller CB until it is the same size as the larger CB to generate the coded CB. The CRC bits are added for CB1, CB2 and coded TB respectively. Same or different number of CRC bits (e.g., longer CRC bits) may be used for source CBs and coded CBs.

In other cases, as illustrated in FIG. 4B, the base station 105 may apply the outer code 405-b after coding and rate-matching. For example, the base station 105 may add together rate-matched output bits of CBs among TBs (e.g., RateMatchedCB1=RateMatchedCB1_TB1+RateMatchedCB1_TB2, RateMatchedCB2=RateMatchedCB2_TB1+RateMatchedCB2_TB2) for outer coding. The base station 105 may interleave the CBs and map the CBs into resource elements. The base station 105 may then transmit the coded CBs to a UE 115.

In some cases, when the UE 115 receives the CBs, the UE 115 may use the outer coding scheme shown in FIG. 4A or FIG. 4B to recover incorrectly decoded CBs. For example, if the UE 115 receives CBs CB1_TB1 and CB1_TB2 and coded CB CBOuterCode1, but does not decode CB_TB1 or CB_TB2 correctly, the UE 115 may add CBOuterCode to CB_TB1 or CB_TB2 to recover the one that was incorrectly decoded. The UE 115 may perform a similar operation for the rate-matched CBs. In some examples, if the CBs are coded according to the scheme shown in FIG. 4A, the UE 115 may decode the source CBs and coded CBs separately (e.g., because they are coded at the information bit level). In other examples, if the CBs are coded according to scheme shown in FIG. 4B, the UE 115 may not decode the coded CBs but only decode source CBs (e.g., because the UE 115 may use the LLR of coded CB to descramble the LLR the CB prior to decoding). For example, if the UE 115 decodes CB1_TB2 incorrectly, the UE 115 may descramble the LLRs for the CBOuterCode1 with the coded and rate matched bits of RateMatchedCB1 to decode and recover CB1_TB2 that was incorrectly decoded.

The UE 115 may send an ACK message for a TB when the UE 115 has decoded the corresponding CBs (with or without using the coded TB). The UE 115 may send a NACK message for TBs that are incorrectly decoded and may not be recovered (e.g., more than one CB or coded CB are incorrectly decoded). If the UE 115 decodes the coded CB (e.g., CBOuterCode) incorrectly, the UE 115 may or may not send an ACK or a NACK message.

In some cases, the base station 105 may apply an outer code 405 across a CBG within a TB, or among TBs if the CBG is configured for multicast (e.g., independent from unicast). If a TB is relatively large, then the CBs may be grouped into smaller CBGs. In such cases, the base station may allocate a feedback bit (e.g., HARQ-ACK bit) to each CBG in a TB. Thus, there may be more than one feedback bit per TB. In some cases, the size of the CBG may be configured (e.g., higher-layer configured). The base station may indicate the size of the CBG and which CBG is transmitted using the CBGTI bitmap in a DCI message. If the base station 105 uses the outer code 405, the base station 105 may use the CBGTI field to indicate the source CBG and the outer-coded CBG. For example, the CBGTI size may be based on an RRC signaled CBG value for source CBGs (e.g., a maximum value) plus the number of outer codes based on the source CBGs. If the CBG-based outer code 405 is used across different TBs, the TBs may share CBGTI.

In some examples, the base station 105 may apply the outer code 405 to the CBGs before coding or rate-matching. The CBG for source CBs may not be impacted by the outer code 405. For example, without applying the outer code, the number of CBs in each CBG may be indicated by RRC signaling (e.g., if CBG_max=2, then CBG1={CB1,2} and CBG2={CB3,4}). When the base station 105 applies the outer code 405 within a TB, CBGOuterCode1=CBG1_TB1+CBG2_TB1 and CBGOuterCode2=CBG1_TB2+CBG2_TB2. When the base station 105 applies the outer code 405 among TBs, CBGOuterCode1=CBG1_TB1+CBG1_TB2 and CBGOuterCode2=CBG2_TB1+CBG2_TB2. In some cases, there may not be an additional feedback bit (e.g., HARQ-ACK bit) for CBGOuterCode. In other examples, the base station 105 may apply the outer code 405 to the CBGs after the coding or rate-matching. The base station 105 may add together the rate-matched output bits (e.g., RateMatchedCBG1_TB1+RateMatchedCBG1_TB2 for CBG among TBs) to get the outer coding.

In some cases, the base station 105 may support the outer code across multiple component carriers (CCs). For example, each CC may have an independent TB and HARQ. If there are 4 TBs on 4 CCs, the base station 105 may outer code 5 TBs while mapping into 5 CCs (e.g., $TB_i$ on $i^{th}$ CC with i=1 . . . 4 and TB5=TB1+TB2+TB3+TB4 on the fifth CC).

A UE 115 may transmit, to base station 105-*b*, a UE capability message (or report) indicating support for outer codes in the PHY or RLC. In some cases, the outer code may be across CCs and UE 115 may report the capability per CC, per band combo or per band of band combo (BoBC) (e.g., the base station 105 may group the UEs with the same capability for multicast transmissions based on which CCs use outer codes). In other cases, UE 115 may support different data rates for outer codes and non-outer codes. When the outer code in PHY, the UE 115 may indicate the max data rate per CC, or a weight factor of how many CCs are used by the outer code (e.g., UE 115 may support 6CC with no outer code, but 4CC without outer code+1 CC with outer code). UE 115 may signal if the outer code capability is per BoBC (or featureSet).

In some examples, base station 105 may determine UE grouping based on the UE 115 capability. Base station 105 may transmit a NR multicast to a group of UEs with a same capability of outer codes. In some cases, the base station 105 may transmit multicast data separately to different groups. In other cases, the multicast transmission with outer codes are transparent to the UE which incapable of outer codes, using different RNTI or DCI indication.

Base station 105 may transmit NR multicast to UEs without outer code and with outer code capability. In some examples, the same data may be transmitted to different groups of UEs with different UE capability. The multicast transmission may indicate different thresholds for UEs supporting outer codes and UEs not supporting outer codes (e.g., a higher RSRP/SINR threshold for UEs not supporting outer coding to monitor multicast transmissions).

Figure 5:
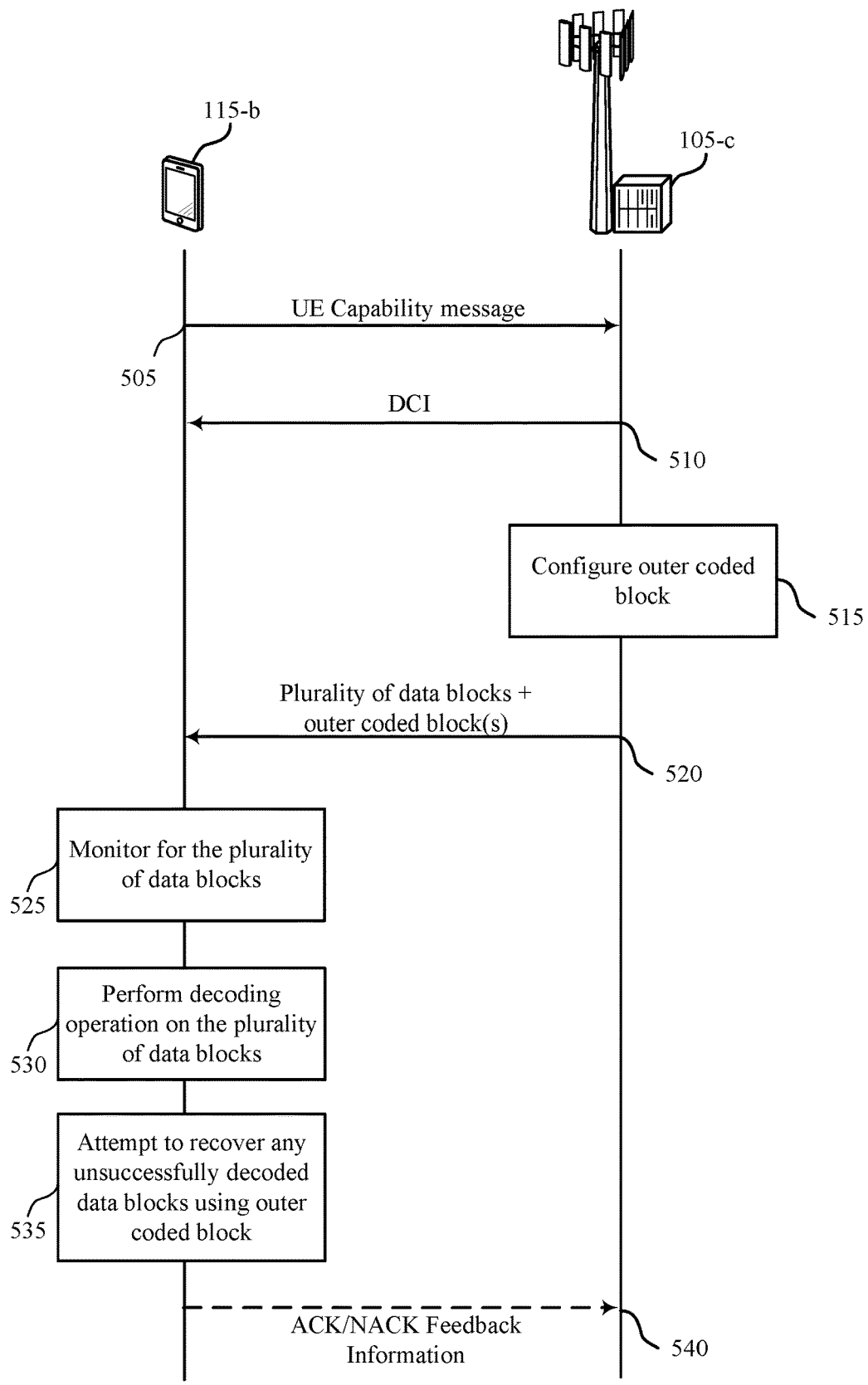
FIG. 5 illustrates an example of a process flow that supports outer coding schemes in downlink control information in accordance with aspects of the present disclosure.

FIG. 5 illustrates an example of a process flow 500 that supports outer coding schemes in downlink control information in accordance with aspects of the present disclosure. In some examples, process flow 500 may implement aspects of wireless communications system 100 and may include UE 115-*c* and base station 105-*b*, which may be examples of UEs 115 and a base station 105 described with reference to FIG. 1.

At 505, UE 115-*c* may transmit, to base station 105-*b*, a UE capability message indicating support for outer coding by the UE 115-*c*. The capability message may include an indication of the support for outer coding per component carrier of a plurality of component carriers or an indication of the support for outer coding of one or more data rates for outer coding or non-outer coding. In some examples, base station 105-*b* may identify the UE 115-*c* as part of a grouping of a plurality of UEs based on the support for outer coding by the UE and transmit a multicast signal to the grouping of the plurality of UEs. In some cases, base station 105-*b* may transmit the multicast signal to one or more UEs not indicating support for outer coding.

At 510, base station 105-*b* may transmit, to UE 115-*c*, a DCI on a wireless channel, the DCI indicating an outer coding scheme for a plurality of data blocks (e.g., each data block of the plurality of data blocks includes one or more of: a TB, a CB, or a CBG). The plurality of data blocks may be associated with a multicast transmission or a broadcast transmission. The DCI may include an indication of the outer coded block. The indication may include a HARQ ID indicating the outer coded block, an RV ID indicating the outer coded block, a CBGTI indicating the outer coded block, or a dedicated field indication the outer coded block. In some examples, UE 115-*c* may receive, from base station 105-*b*, an RRC message configuring a format for indicating the outer coded block in the DCI and identify the outer coded block based on the RRC message and the DCI.

At 515, base station 105-*b* may configure the outer coded block by combining a first data block and a second data block of the plurality of data blocks. In some cases, the outer coding block may be configured by combining a rate matched encoded version of the first data block with a rate matched encoded version of the second data block to obtain a rate matched encoded version of the outer coded block. In other cases, the outer coding block may be configured by a cyclic redundancy check of the plurality of data blocks being added per source of the plurality of data blocks and coded. The first data block and the second data block may be CBs or CBGs from a same or different TB.

At 520, base station 105-*b* may transmit, to UE 115-*c*, on the wireless channel the plurality of data blocks and an outer coded block based on the plurality of data blocks and the outer coding scheme. This transmission may, in some examples, be a broadcast transmission or a multicast transmission. At 525, UE 115-c may monitor the wireless channel for the plurality of data blocks and an outer coded block based on the plurality of data blocks and the outer coding scheme. At 530, base station 105-b may attempt to decode each of the data blocks as received over the wireless channel by performing a decoding operation.

If any of the data blocks is unsuccessfully decoded, at 535 UE 115-c may attempt to recover that data block using the outer coded block in combination with a successfully received data block, as discussed above. More specifically, UE 115-c may decode the outer coded block and a first data block of the plurality of data blocks and perform, based on a success of decoding the outer coded block and the first data block, an outer decoding procedure for a second data block of the plurality of data blocks using the outer coded block and the first data block.

UE 115-c may perform the outer decoding procedure for the second data block by removing one or more padding bits from the combination of the outer coded block and the first data block. In some cases, UE 115-c may perform the outer decoding procedure for the second data block by combining an LLR of the outer coded block with an LLR of the first data block to obtain an LLR of the second data block and decoding the second data block based on the combining. In other cases, UE 115-c may perform the outer decoding procedure for the second data block by combining the decoded outer coded block with the decoded first data block to obtain the second data block.

At 540, UE 115-c may transmit, to base station 105-b, ACK/NACK feedback information based on a success of the outer decoding procedure. In some cases, UE 115-c may not transmit ACK feedback information at all, and may only transmit NACK feedback information for data blocks that cannot be decoded or recovered using the outer coded block. Base station 105-c may monitor for the feedback information from UE 115-c, and may retransmit any data blocks for which NACK feedback information is received.

Figure 6:
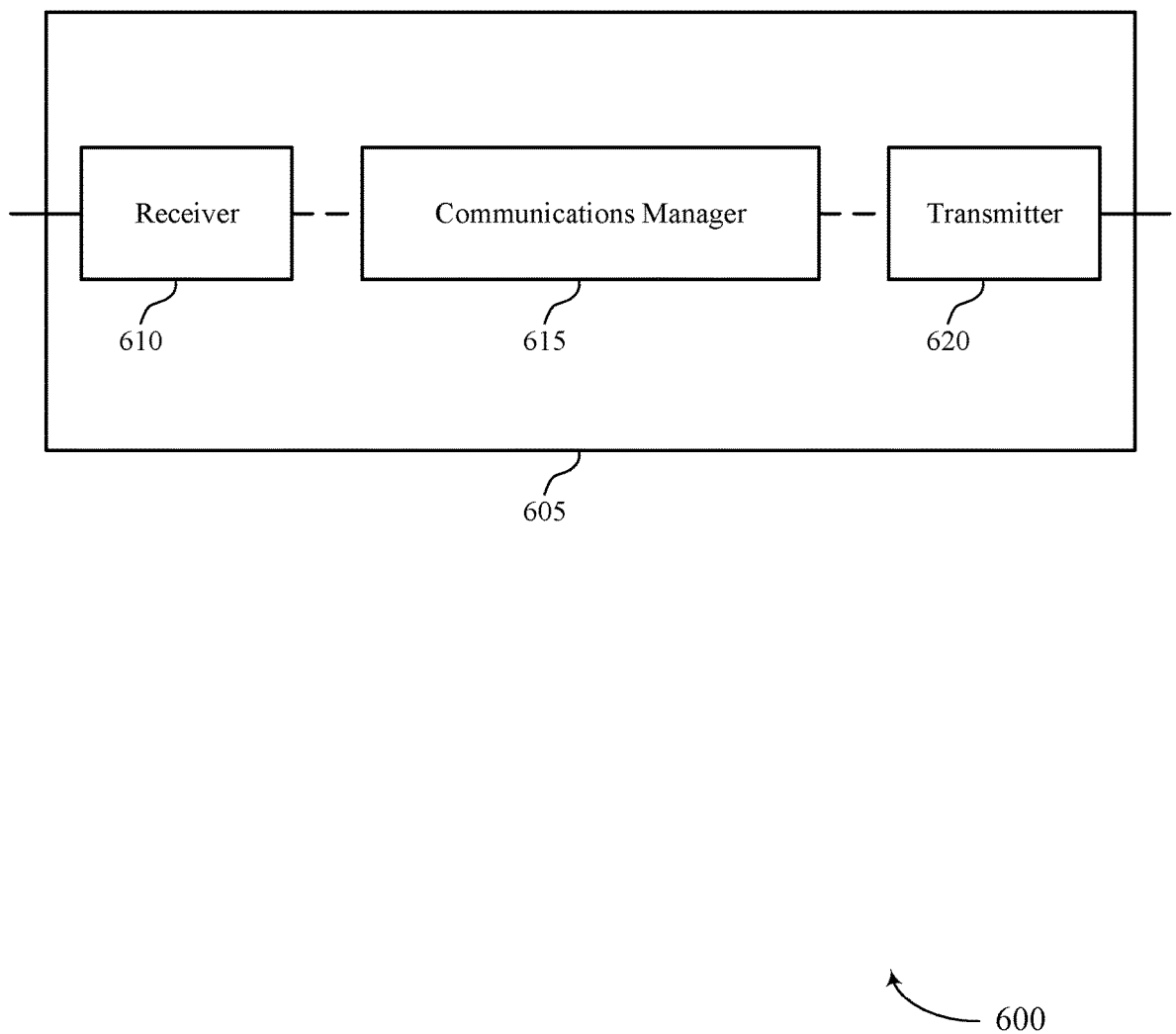
FIGS. 6 and 7 show block diagrams of devices that support outer coding schemes in downlink control information in accordance with aspects of the present disclosure.

FIG. 6 shows a block diagram 600 of a device 605 that supports outer coding schemes in downlink control information in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to outer coding schemes in downlink control information, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive downlink control information on a wireless channel, the downlink control information indicating an outer coding scheme for a set of data blocks associated with a multicast transmission or a broadcast transmission, monitor the wireless channel for the set of data blocks and an outer coded block based on the set of data blocks and the outer coding scheme, and decode the set of data blocks based on the outer coding scheme and the outer coded block. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the UE communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The UE communications manager 615 as described herein may be implemented to realize one or more potential advantages. One implementation may allow the device 605 to receive a DCI indicating an outer coding scheme. Such indication may enable techniques for coding data blocks at the PHY layer, which may result in improved system reliability and more efficient communications Based on techniques for supporting outer coding schemes in a DCI as described herein, a processor of a UE 115 (e.g., controlling the receiver 610, the transmitter 620, or the transceiver 920 as described with reference to FIG. 9) may increase reliability and decrease signaling overhead in the communications due to reducing retransmissions. UE 115 may decode data blocks according to an outer coding scheme while ensuring relatively efficient communications. For example, the coding techniques described herein may leverage an outer coded data block to recover an incorrectly decoded data block, which may realize reduced signaling overhead and power savings, among other benefits.

Figure 7:
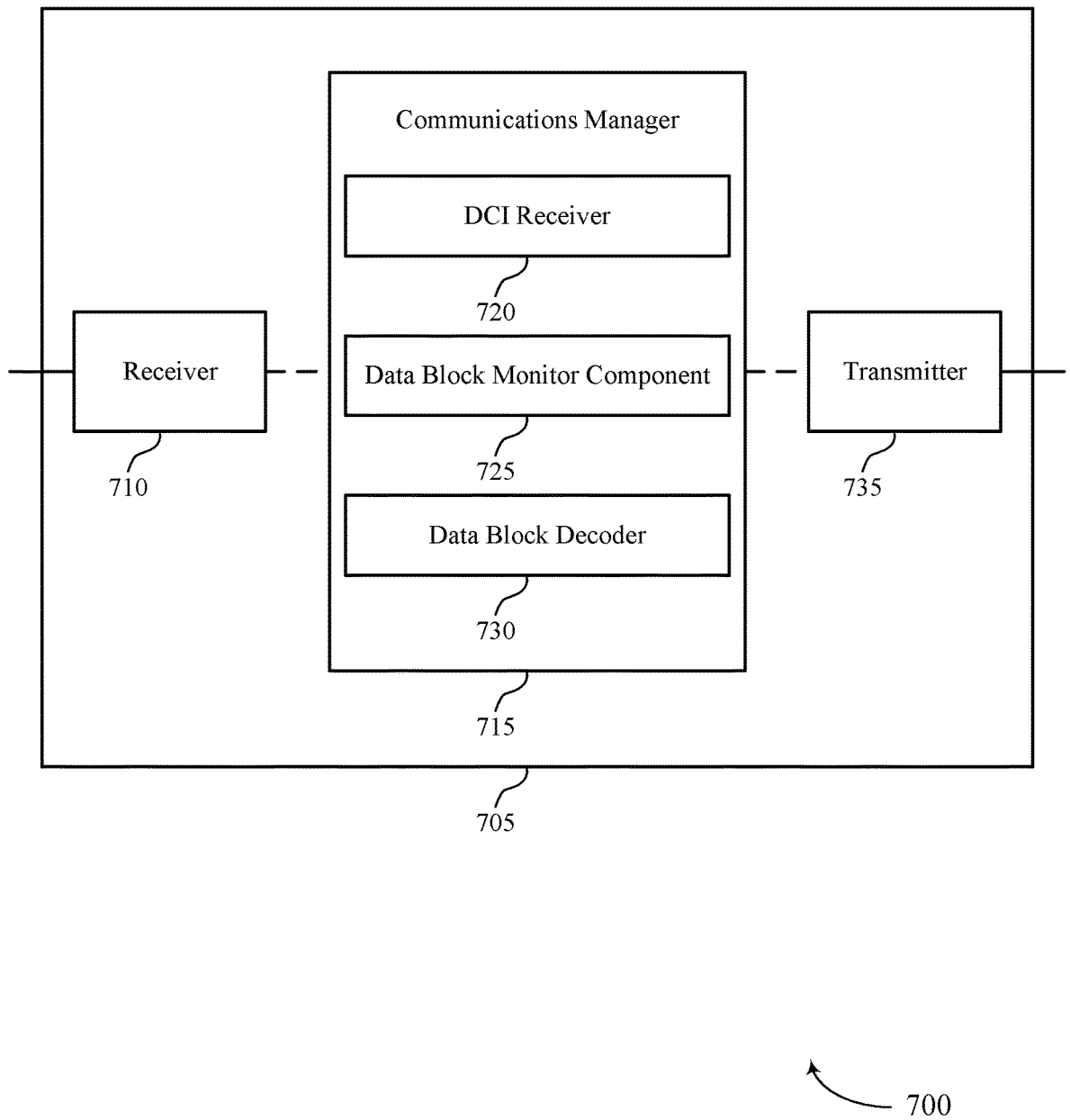

FIG. 7 shows a block diagram 700 of a device 705 that supports outer coding schemes in downlink control information in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to outer coding schemes in downlink control information, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DCI receiver 720, a data block monitor component 725, and a data block decoder 730. The communications manager 715 may be an example of aspects of the communications manager 910 described herein.

The DCI receiver 720 may receive downlink control information on a wireless channel, the downlink control information indicating an outer coding scheme for a set of data blocks associated with a multicast transmission or a broadcast transmission.

The data block monitor component 725 may monitor the wireless channel for the set of data blocks and an outer coded block based on the set of data blocks and the outer coding scheme.

The data block decoder 730 may decode the set of data blocks based on the outer coding scheme and the outer coded block.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
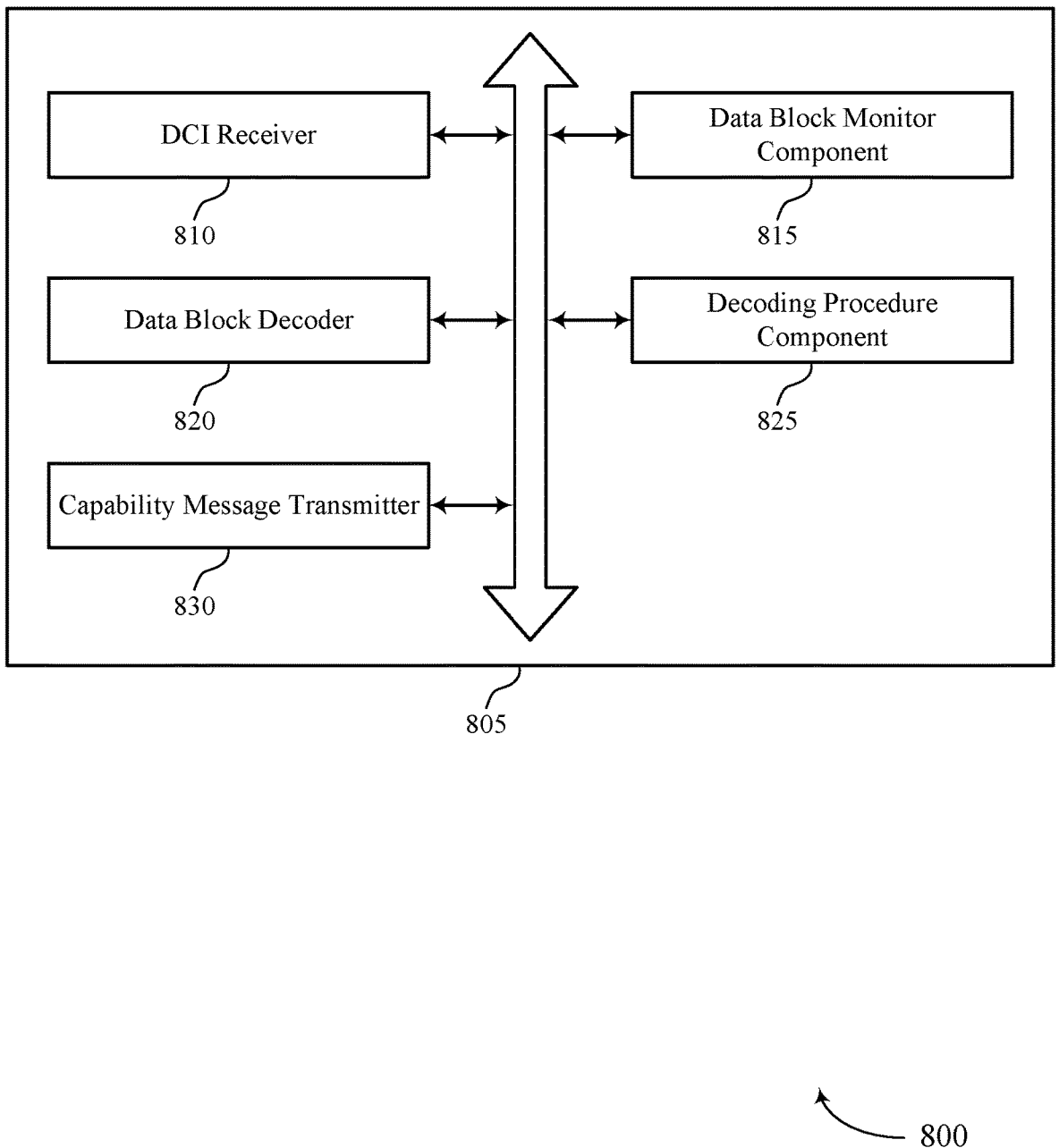
FIG. 8 shows a block diagram of a communications manager that supports outer coding schemes in downlink control information in accordance with aspects of the present disclosure.

FIG. 8 shows a block diagram 800 of a communications manager 805 that supports outer coding schemes in downlink control information in accordance with aspects of the present disclosure. The communications manager 805 may be an example of aspects of a communications manager 615, a communications manager 715, or a communications manager 910 described herein. The communications manager 805 may include a DCI receiver 810, a data block monitor component 815, a data block decoder 820, a decoding procedure component 825, and a capability message transmitter 830. Each of these modules may communicate, directly or indirectly, with one another (e.g., via one or more buses).

The DCI receiver 810 may receive downlink control information on a wireless channel, the downlink control information indicating an outer coding scheme for a set of data blocks associated with a multicast transmission or a broadcast transmission.

In some examples, the DCI receiver 810 may receive a downlink control information transmission including an indication of the outer coded block.

In some examples, the DCI receiver 810 may CB group transmission information indicating the outer coded block; or.

In some examples, the DCI receiver 810 may receive a radio resource control message configuring a format for indicating the outer coded block in the downlink control information.

In some examples, the DCI receiver 810 may identify the outer coded block based on the radio resource control message and the downlink control information.

In some cases, a hybrid automatic repeat request process identifier indicating the outer coded block.

In some cases, a redundancy version identifier indicating the outer coded block.

In some cases, a dedicated field indicating the outer coded block.

The data block monitor component 815 may monitor the wireless channel for the set of data blocks and an outer coded block based on the set of data blocks and the outer coding scheme.

The data block decoder 820 may decode the set of data blocks based on the outer coding scheme and the outer coded block.

In some examples, the data block decoder 820 may decode the outer coded block and a first data block of the set of data blocks.

The decoding procedure component 825 may perform, based on a success of decoding the outer coded block and the first data block, an outer decoding procedure for a second data block of the set of data blocks using the outer coded block and the first data block.

In some examples, the decoding procedure component 825 may perform the outer decoding procedure for the second data block is further based on a determination that an initial decoding of the second data block was unsuccessful.

In some examples, the decoding procedure component 825 may remove one or more padding bits from the combination of the outer coded block and the first data block.

In some examples, the decoding procedure component 825 may combine a log-likelihood ratio of the outer coded block with a log-likelihood ratio of the first data block to obtain a log-likelihood ratio of the second data block.

In some examples, the decoding procedure component 825 may decode the second data block based on the combining.

In some examples, the decoding procedure component 825 may combine the decoded outer coded block with the decoded first data block to obtain the second data block.

In some examples, the decoding procedure component 825 may transmit an acknowledgement message or a negative acknowledgment message based on a success of the outer decoding procedure. In some cases, a TB, a CB, or a CB group. In some cases, the first data block and the second data block are CBs or CB groups from a same TB. In some cases, the first data block and the second data block are CBs or CB groups from different TBs. In some cases, the first data block and the second data block are CBs from a different TB.

The capability message transmitter 830 may transmit a UE capability message indicating support for outer coding by the UE.

Figure 9:
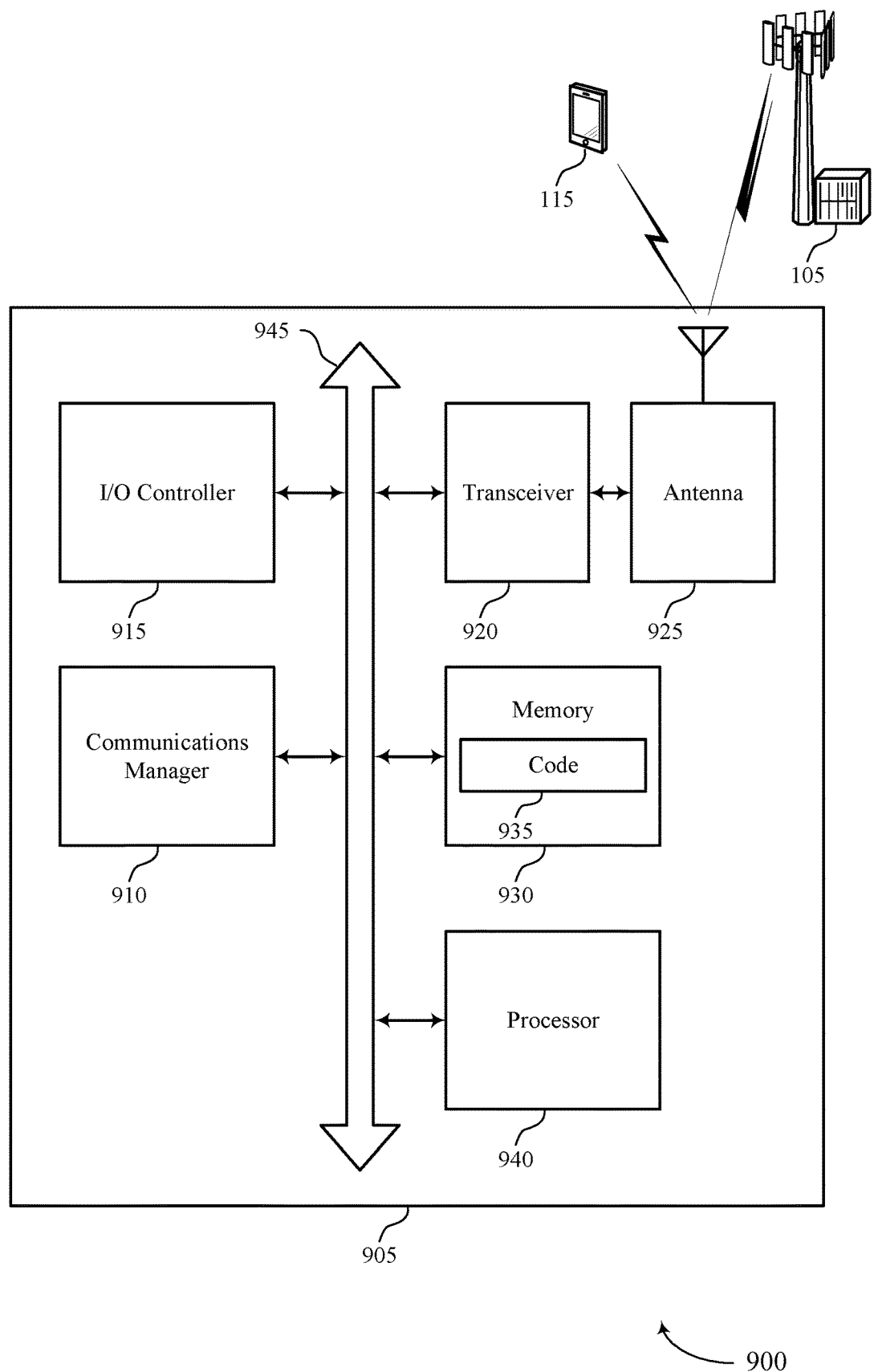
FIG. 9 shows a diagram of a system including a device that supports outer coding schemes in downlink control information in accordance with aspects of the present disclosure.

FIG. 9 shows a diagram of a system 900 including a device 905 that supports outer coding schemes in downlink control information in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive downlink control information on a wireless channel, the downlink control information indicating an outer coding scheme for a set of data blocks associated with a multicast transmission or a broadcast transmission, monitor the wireless channel for the set of data blocks and an outer coded block based on the set of data blocks and the outer coding scheme, and decode the set of data blocks based on the outer coding scheme and the outer coded block.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting outer coding schemes in downlink control information).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
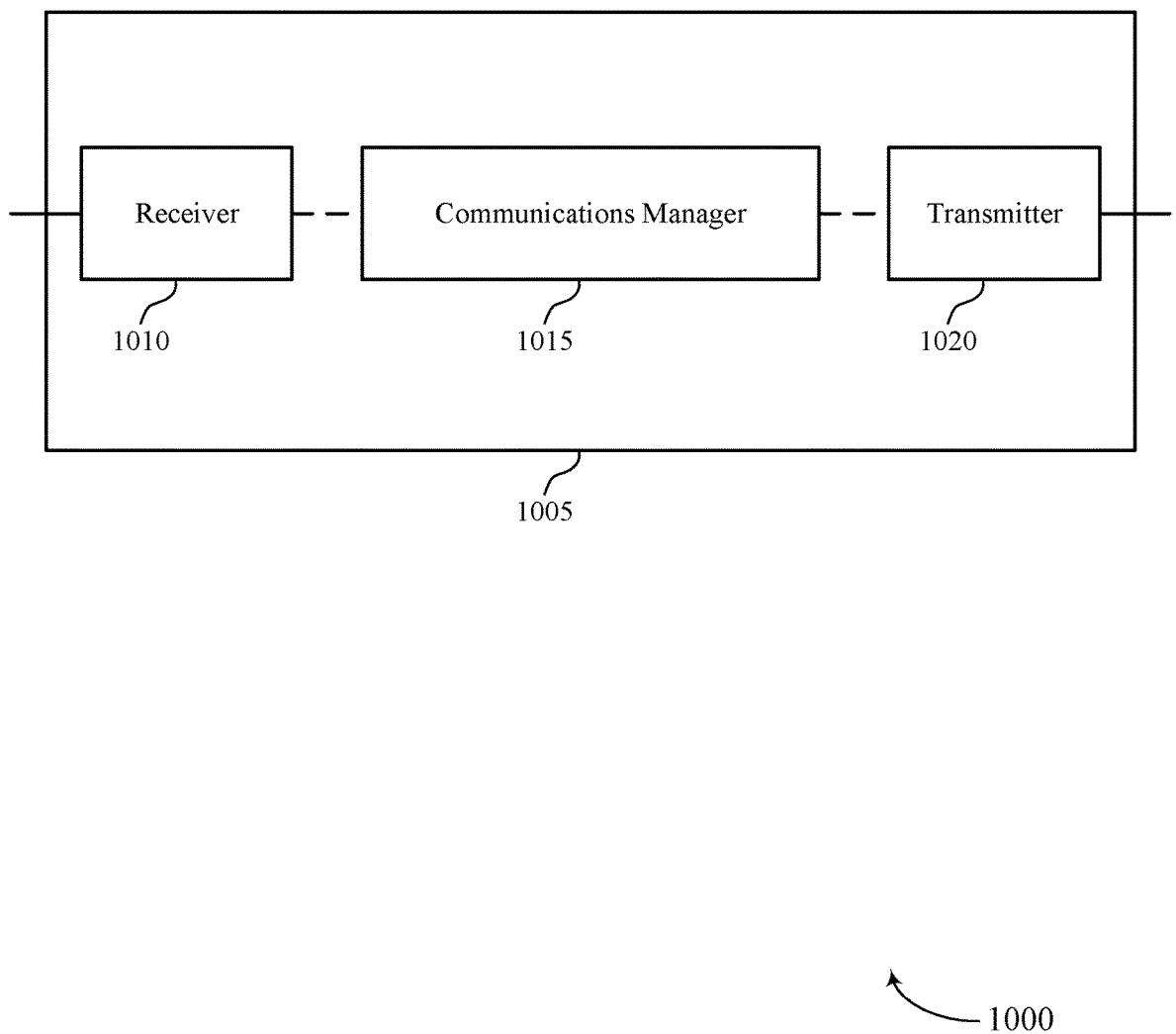
FIGS. 10 and 11 show block diagrams of devices that support outer coding schemes in downlink control information in accordance with aspects of the present disclosure.

FIG. 10 shows a block diagram 1000 of a device 1005 that supports outer coding schemes in downlink control information in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to outer coding schemes in downlink control information, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit downlink control information on a wireless channel, the downlink control information indicating an outer coding scheme for a set of data blocks associated with a multicast transmission or a broadcast transmission, transmit on the wireless channel the set of data blocks and an outer coded block based on the set of data blocks and the outer coding scheme, and monitor for an outer coding procedure of the set of data blocks based on the outer coding scheme and the outer coded block. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 may be implemented as an integrated circuit or chipset for a mobile device modem, and the receiver 1010 and transmitter 1020 may be implemented as analog components (e.g., amplifiers, filters, antennas) coupled with the mobile device modem to enable wireless transmission and reception over one or more bands.

The communications manager 1015 as described herein may be implemented to realize one or more potential advantages. One implementation may allow the device 1005 to receive a DCI indicating an outer coding scheme. Such indication may enable techniques for coding data blocks at the PHY layer, which may result in improved system reliability and more efficient communications Based on techniques for supporting outer coding schemes in a DCI as described herein, a processor of a UE 115 (e.g., controlling the receiver 1010, the transmitter 1020, or the transceiver 1320 as described with reference to FIG. 13) may increase reliability and decrease signaling overhead in the communications due to reducing retransmissions. UE 115 may decode data blocks according to an outer coding scheme while ensuring relatively efficient communications. For example, the coding techniques described herein may leverage an outer coded data block to recover an incorrectly decoded data block, which may realize reduced signaling overhead and power savings, among other benefits.

Figure 11:
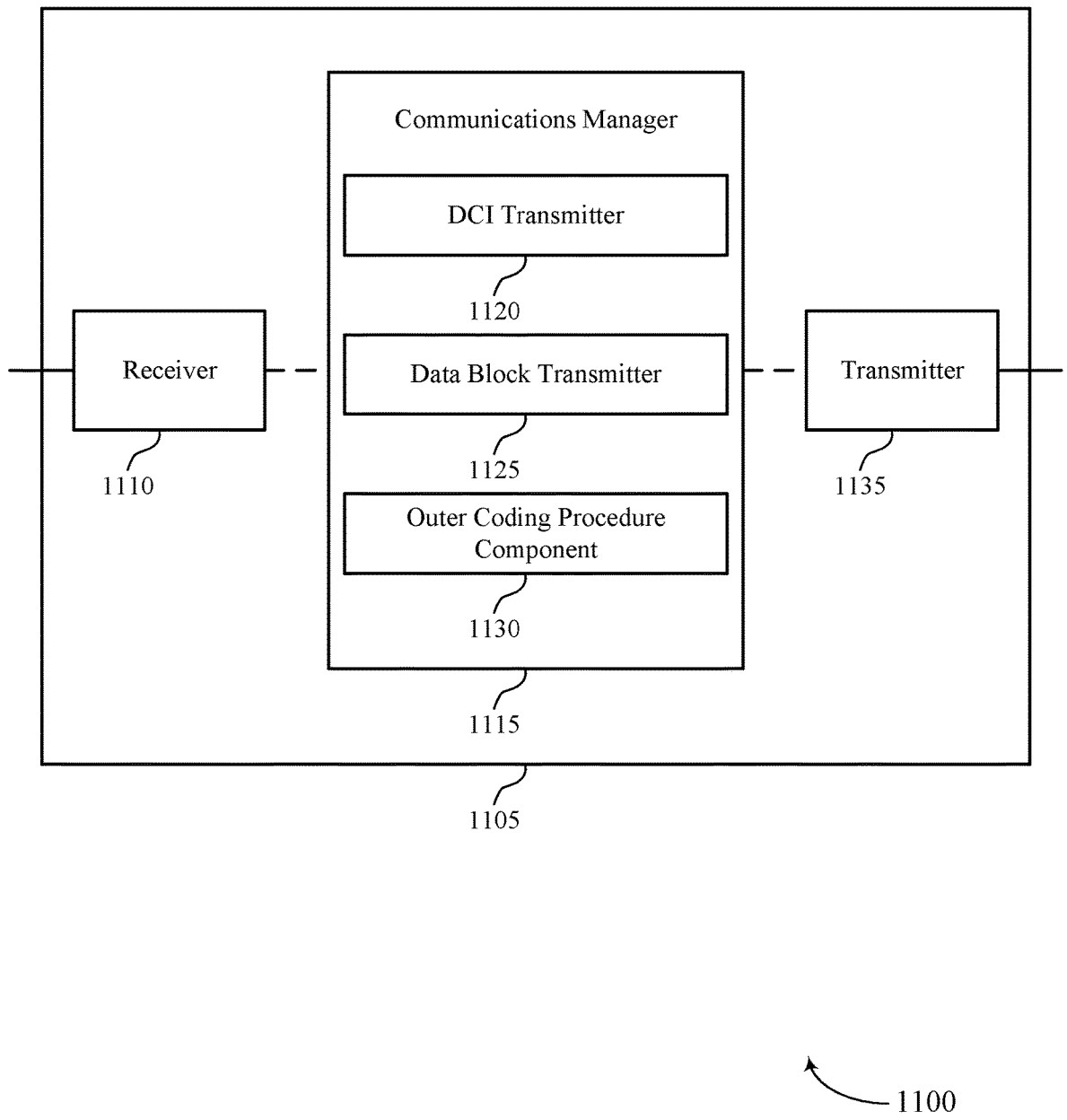

FIG. 11 shows a block diagram 1100 of a device 1105 that supports outer coding schemes in downlink control information in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to outer coding schemes in downlink control information, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DCI transmitter 1120, a data block transmitter 1125, and an outer coding procedure component 1130. The communications manager 1115 may be an example of aspects of the communications manager 1310 described herein.

The DCI transmitter 1120 may transmit downlink control information on a wireless channel, the downlink control information indicating an outer coding scheme for a set of data blocks associated with a multicast transmission or a broadcast transmission.

The data block transmitter 1125 may transmit on the wireless channel the set of data blocks and an outer coded block based on the set of data blocks and the outer coding scheme.

The outer coding procedure component 1130 may monitor for an outer coding procedure of the set of data blocks based on the outer coding scheme and the outer coded block.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
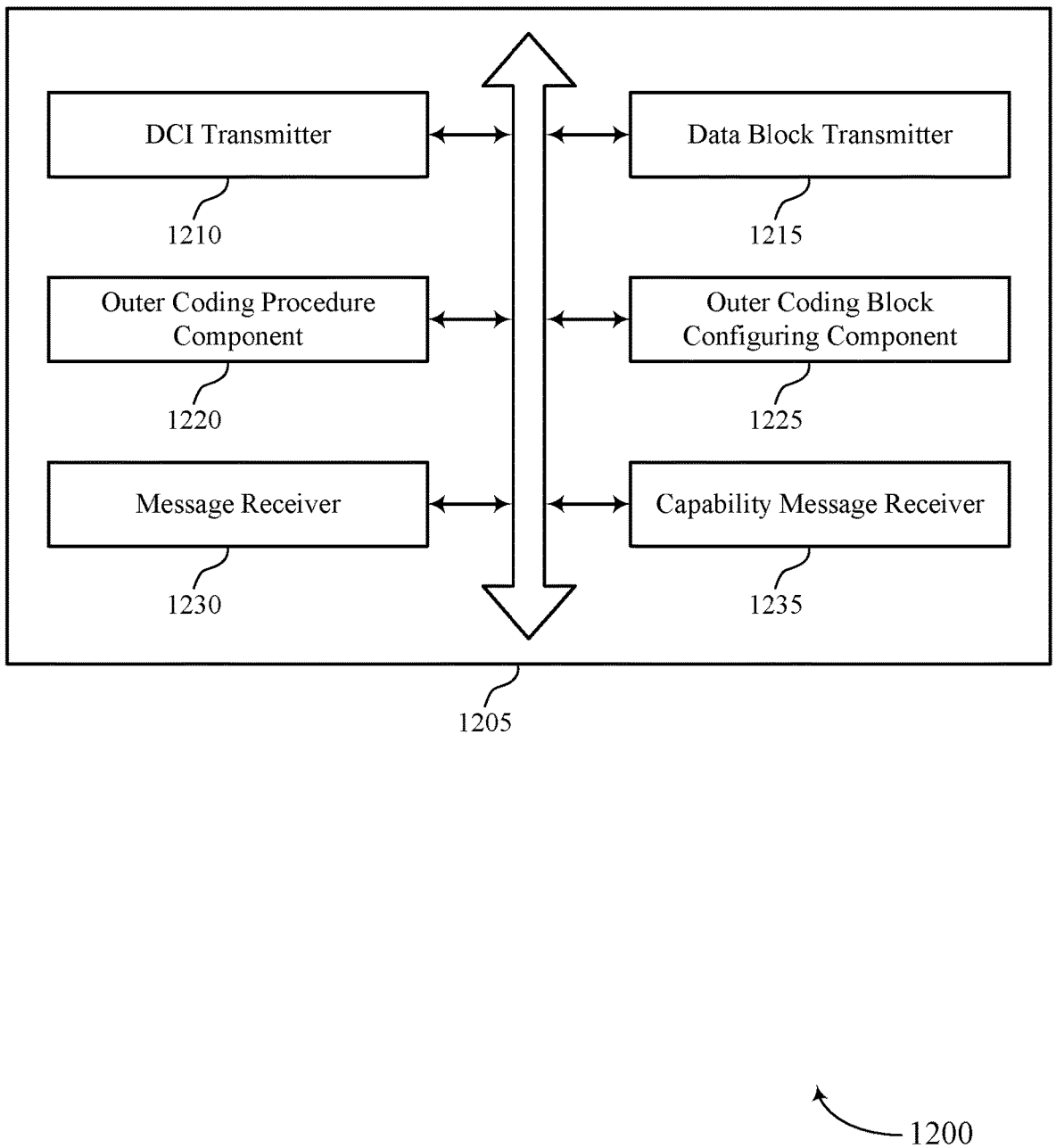
FIG. 12 shows a block diagram of a communications manager that supports outer coding schemes in downlink control information in accordance with aspects of the present disclosure.

FIG. 12 shows a block diagram 1200 of a communications manager 1205 that supports outer coding schemes in downlink control information in accordance with aspects of the present disclosure. The communications manager 1205 may be an example of aspects of a communications manager 1015, a communications manager 1115, or a communications manager 1310 described herein. The communications manager 1205 may include a DCI transmitter 1210, a data block transmitter 1215, an outer coding procedure component 1220, an outer coding block configuring component 1225, a message receiver 1230, and a capability message receiver 1235. Each of these modules may communicate, directly or indirectly, with one another (e.g., via one or more buses).

The DCI transmitter 1210 may transmit downlink control information on a wireless channel, the downlink control information indicating an outer coding scheme for a set of data blocks associated with a multicast transmission or a broadcast transmission.

In some examples, the DCI transmitter 1210 may transmit a downlink control information transmission including an indication of the outer coded block.

In some examples, the DCI transmitter 1210 may CB group transmission information indicating the outer coded block; or.

In some examples, the DCI transmitter 1210 may transmit a radio resource control message configuring a format for indicating the outer coded block in the downlink control information.

In some cases, a hybrid automatic repeat request process identifier indicating the outer coded block.

In some cases, a redundancy version identifier indicating the outer coded block.

In some cases, a dedicated field indicating the outer coded block.

The data block transmitter 1215 may transmit on the wireless channel the set of data blocks and an outer coded block based on the set of data blocks and the outer coding scheme.

The outer coding procedure component 1220 may monitor for an outer coding procedure of the set of data blocks based on the outer coding scheme and the outer coded block.

The outer coding block configuring component 1225 may configure the outer coded block by combining a first data block and a second data block of the set of data blocks.

In some examples, the outer coding block configuring component 1225 may combine a rate matched encoded version of the first data block with a rate matched encoded version of the second data block to obtain a rate matched encoded version of the outer coded block.

In some cases, a cyclic redundancy check of the set of data blocks is added per source of the set of data blocks and coded.

The message receiver 1230 may receive an acknowledgement message or a negative acknowledgment message based on a success of the outer decoding procedure.

The capability message receiver 1235 may receive a UE capability message indicating support for outer coding by the UE.

In some examples, the capability message receiver 1235 may identify the UE as part of a grouping of a set of UEs based on the support for outer coding by the UE.

In some examples, the capability message receiver 1235 may transmit a multicast signal to the grouping of the set of UEs.

In some examples, the capability message receiver 1235 may transmit the multicast signal to one or more UEs not indicating support for outer coding.

In some cases, an indication of the support for outer coding per component carrier of a set of component carriers; or.

In some cases, an indication of the support for outer coding of one or more data rates for outer coding or non-outer coding.

Figure 13:
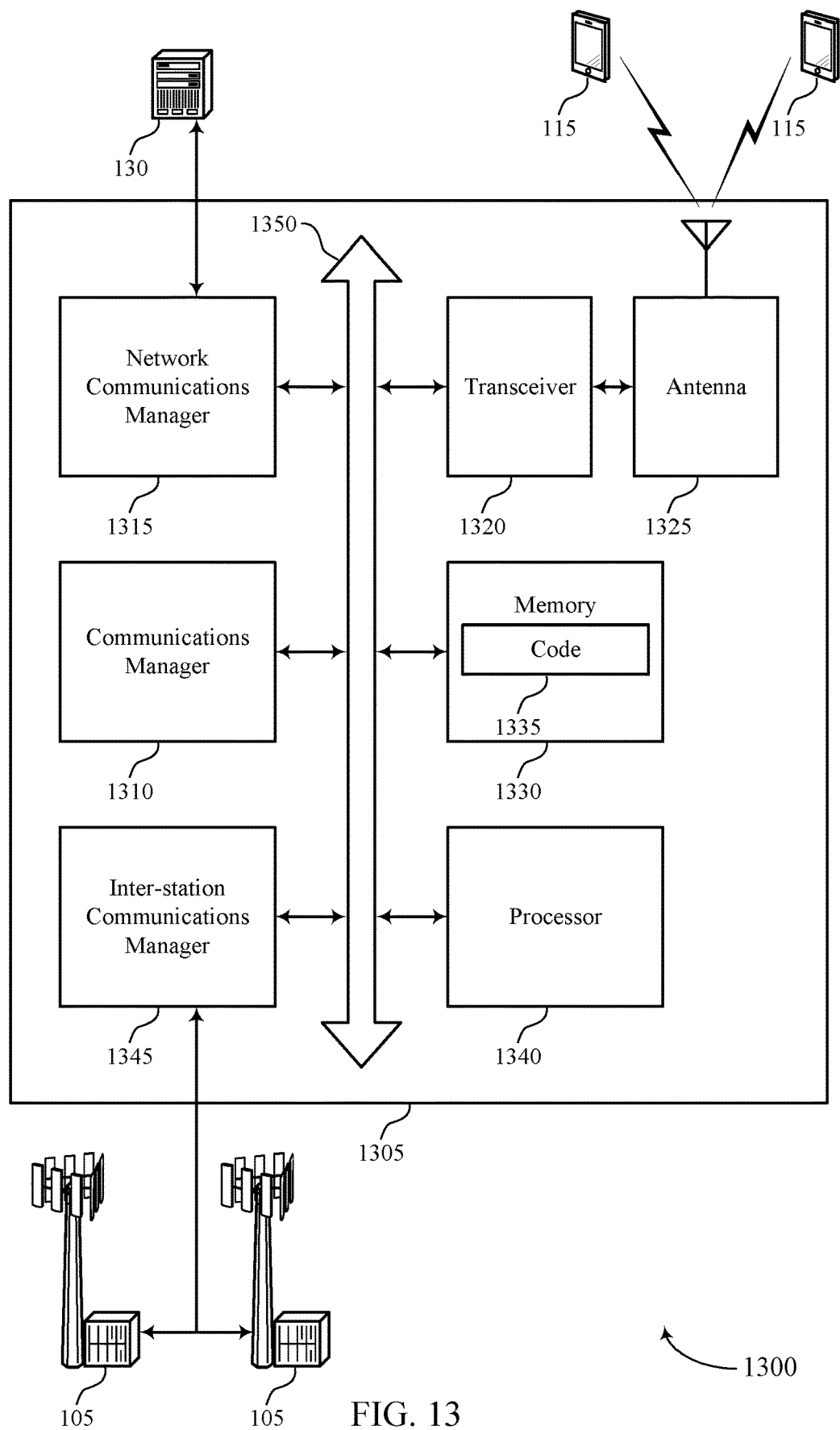
FIG. 13 shows a diagram of a system including a device that supports outer coding schemes in downlink control information in accordance with aspects of the present disclosure.

FIG. 13 shows a diagram of a system 1300 including a device 1305 that supports outer coding schemes in downlink control information in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit downlink control information on a wireless channel, the downlink control information indicating an outer coding scheme for a set of data blocks associated with a multicast transmission or a broadcast transmission, transmit on the wireless channel the set of data blocks and an outer coded block based on the set of data blocks and the outer coding scheme, and monitor for an outer coding procedure of the set of data blocks based on the outer coding scheme and the outer coded block.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting outer coding schemes in downlink control information).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
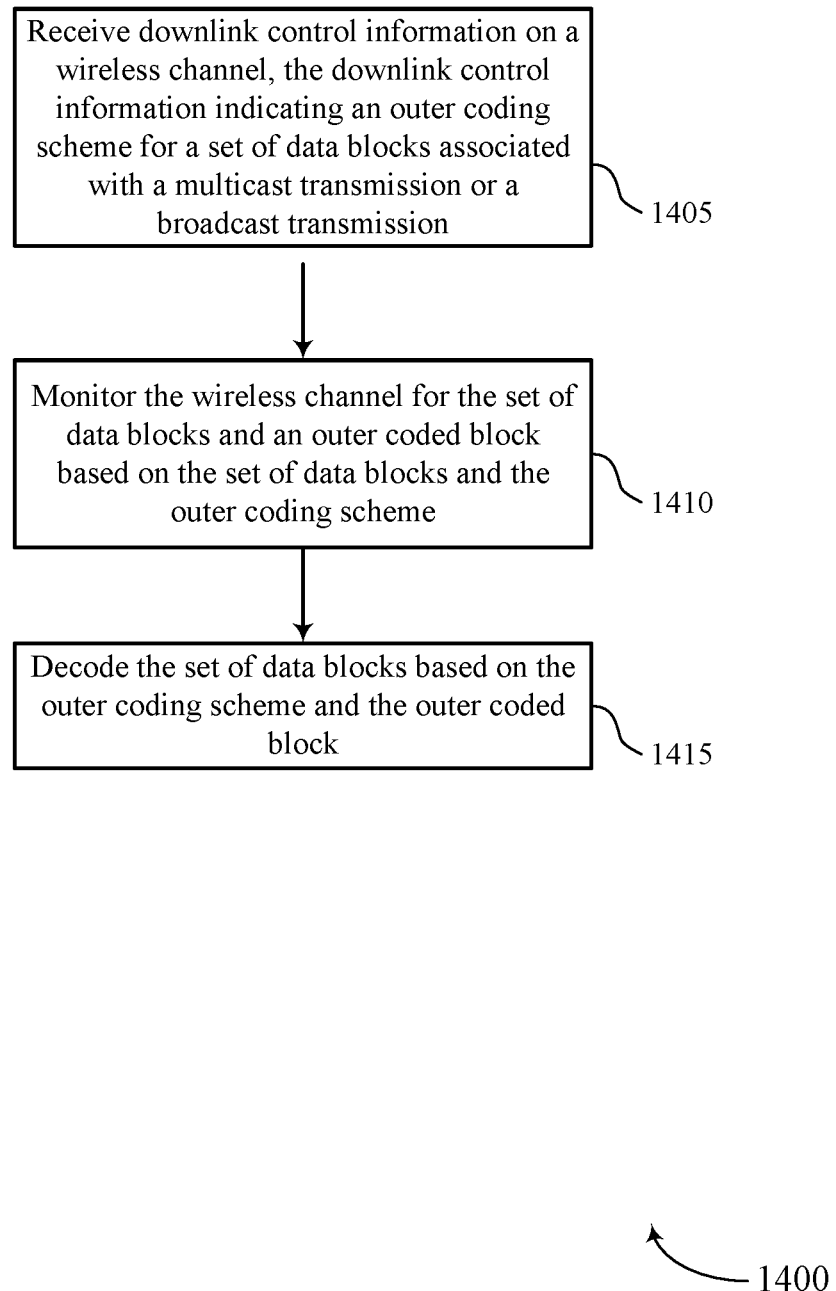
FIGS. 14 through 20 show flowcharts illustrating methods that support outer coding schemes in downlink control information in accordance with aspects of the present disclosure.

FIG. 14 shows a flowchart illustrating a method 1400 that supports outer coding schemes in downlink control information in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive downlink control information on a wireless channel, the downlink control information indicating an outer coding scheme for a set of data blocks associated with a multicast transmission or a broadcast transmission. The operations of 1405 may be performed according to the methods described herein. In some examples, aspects of the operations of 1405 may be performed by a DCI receiver as described with reference to FIGS. 6 through 9.

At 1410, the UE may monitor the wireless channel for the set of data blocks and an outer coded block based on the set of data blocks and the outer coding scheme. The operations of 1410 may be performed according to the methods described herein. In some examples, aspects of the operations of 1410 may be performed by a data block monitor component as described with reference to FIGS. 6 through 9.

At 1415, the UE may decode the set of data blocks based on the outer coding scheme and the outer coded block. The operations of 1415 may be performed according to the methods described herein. In some examples, aspects of the operations of 1415 may be performed by a data block decoder as described with reference to FIGS. 6 through 9.

Figure 15:
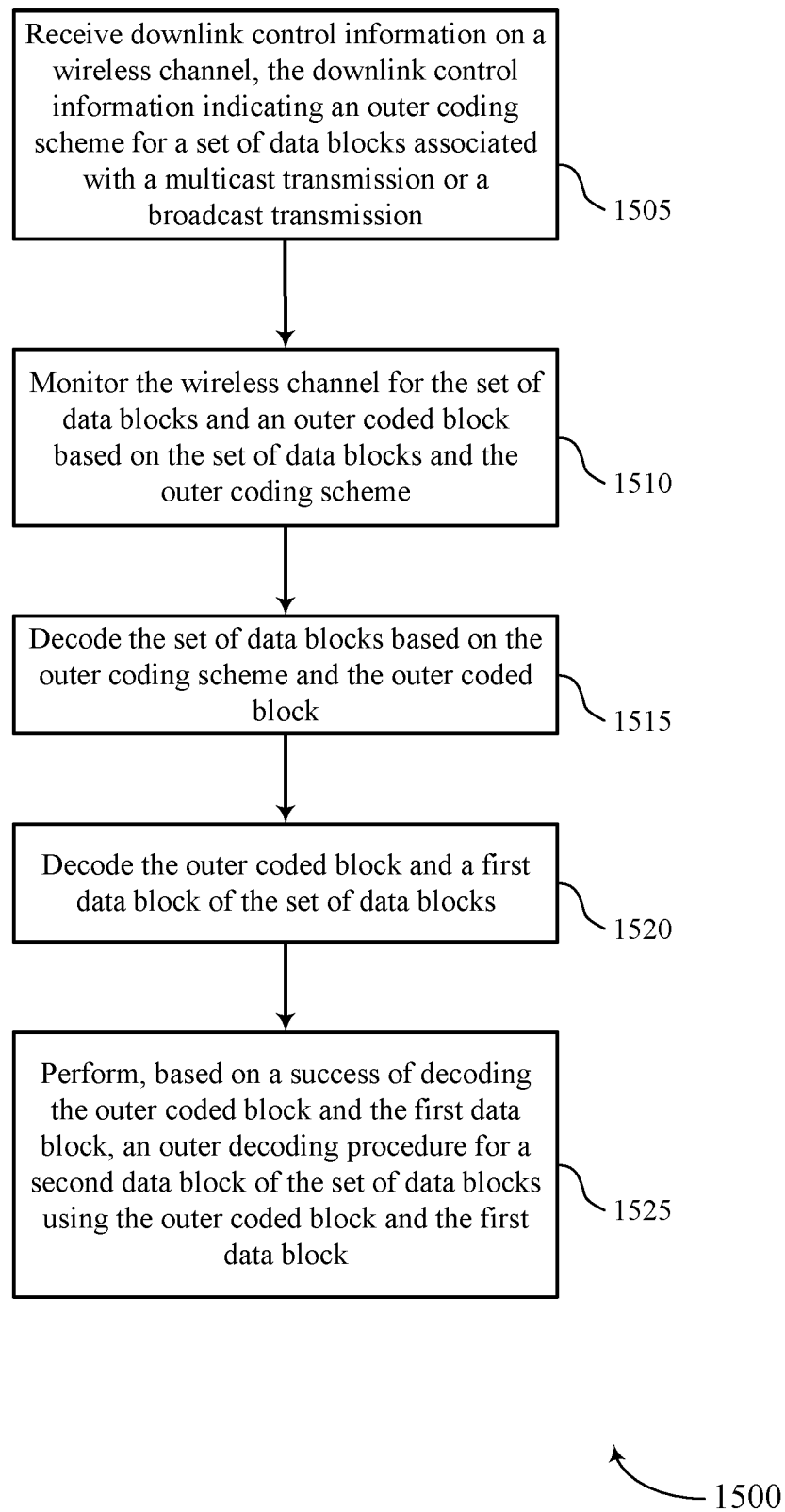

FIG. 15 shows a flowchart illustrating a method 1500 that supports outer coding schemes in downlink control information in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive downlink control information on a wireless channel, the downlink control information indicating an outer coding scheme for a set of data blocks associated with a multicast transmission or a broadcast transmission. The operations of 1505 may be performed according to the methods described herein. In some examples, aspects of the operations of 1505 may be performed by a DCI receiver as described with reference to FIGS. 6 through 9.

At 1510, the UE may monitor the wireless channel for the set of data blocks and an outer coded block based on the set of data blocks and the outer coding scheme. The operations of 1510 may be performed according to the methods described herein. In some examples, aspects of the operations of 1510 may be performed by a data block monitor component as described with reference to FIGS. 6 through 9.

At 1515, the UE may decode the set of data blocks based on the outer coding scheme and the outer coded block. The operations of 1515 may be performed according to the methods described herein. In some examples, aspects of the operations of 1515 may be performed by a data block decoder as described with reference to FIGS. 6 through 9.

At 1520, the UE may decode the outer coded block and a first data block of the set of data blocks. The operations of 1520 may be performed according to the methods described herein. In some examples, aspects of the operations of 1520 may be performed by a data block decoder as described with reference to FIGS. 6 through 9.

At 1525, the UE may perform, based on a success of decoding the outer coded block and the first data block, an outer decoding procedure for a second data block of the set of data blocks using the outer coded block and the first data block. The operations of 1525 may be performed according to the methods described herein. In some examples, aspects of the operations of 1525 may be performed by a decoding procedure component as described with reference to FIGS. 6 through 9.

Figure 16:
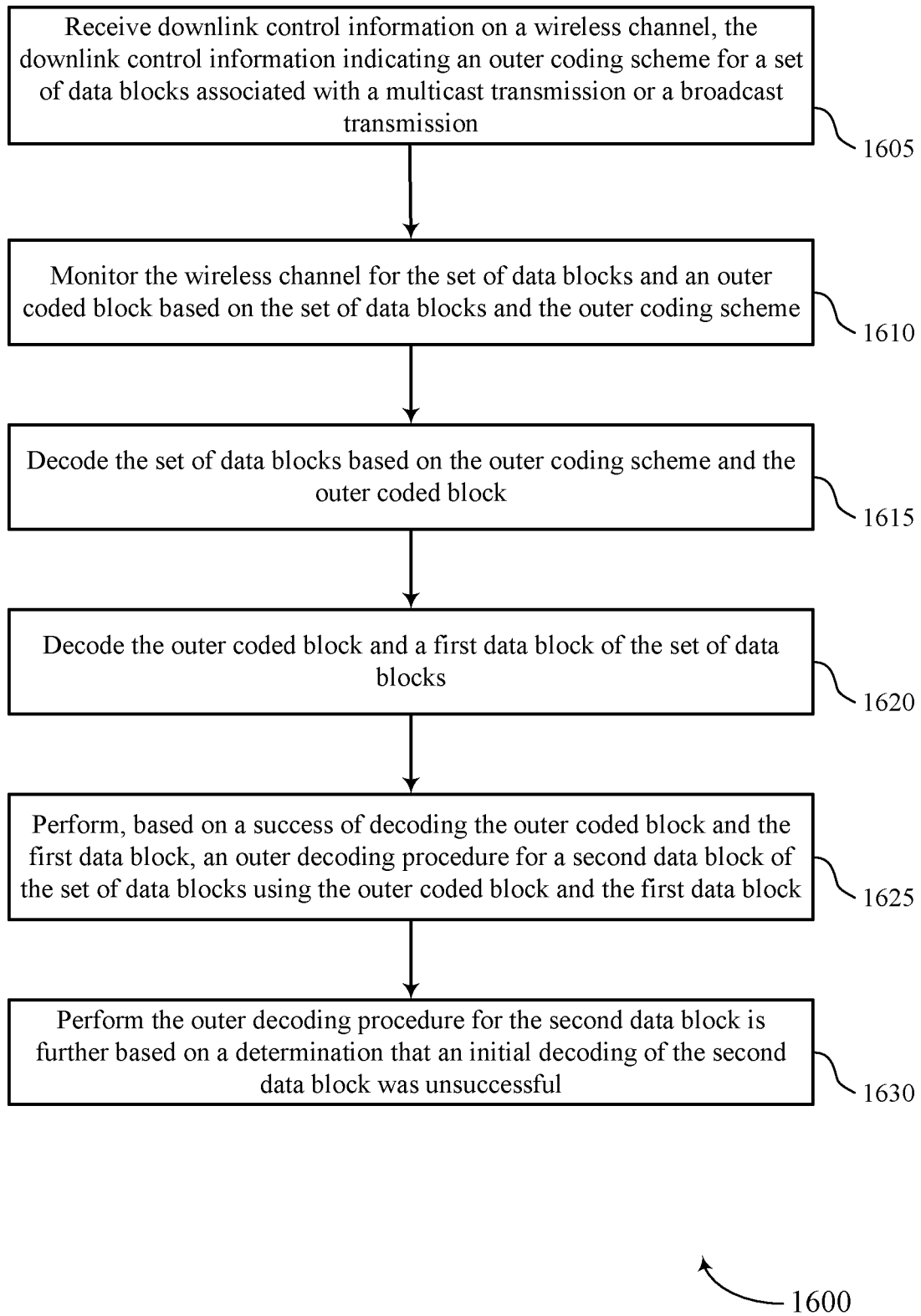

FIG. 16 shows a flowchart illustrating a method 1600 that supports outer coding schemes in downlink control information in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive downlink control information on a wireless channel, the downlink control information indicating an outer coding scheme for a set of data blocks associated with a multicast transmission or a broadcast transmission. The operations of 1605 may be performed according to the methods described herein. In some examples, aspects of the operations of 1605 may be performed by a DCI receiver as described with reference to FIGS. 6 through 9.

At 1610, the UE may monitor the wireless channel for the set of data blocks and an outer coded block based on the set of data blocks and the outer coding scheme. The operations of 1610 may be performed according to the methods described herein. In some examples, aspects of the operations of 1610 may be performed by a data block monitor component as described with reference to FIGS. 6 through 9.

At 1615, the UE may decode the set of data blocks based on the outer coding scheme and the outer coded block. The operations of 1615 may be performed according to the methods described herein. In some examples, aspects of the operations of 1615 may be performed by a data block decoder as described with reference to FIGS. 6 through 9.

At 1620, the UE may decode the outer coded block and a first data block of the set of data blocks. The operations of 1620 may be performed according to the methods described herein. In some examples, aspects of the operations of 1620 may be performed by a data block decoder as described with reference to FIGS. 6 through 9.

At 1625, the UE may perform, based on a success of decoding the outer coded block and the first data block, an outer decoding procedure for a second data block of the set of data blocks using the outer coded block and the first data block. The operations of 1625 may be performed according to the methods described herein. In some examples, aspects of the operations of 1625 may be performed by a decoding procedure component as described with reference to FIGS. 6 through 9.

At 1630, the UE may perform the outer decoding procedure for the second data block is further based on a determination that an initial decoding of the second data block was unsuccessful. The operations of 1630 may be performed according to the methods described herein. In some examples, aspects of the operations of 1630 may be performed by a decoding procedure component as described with reference to FIGS. 6 through 9.

Figure 17:
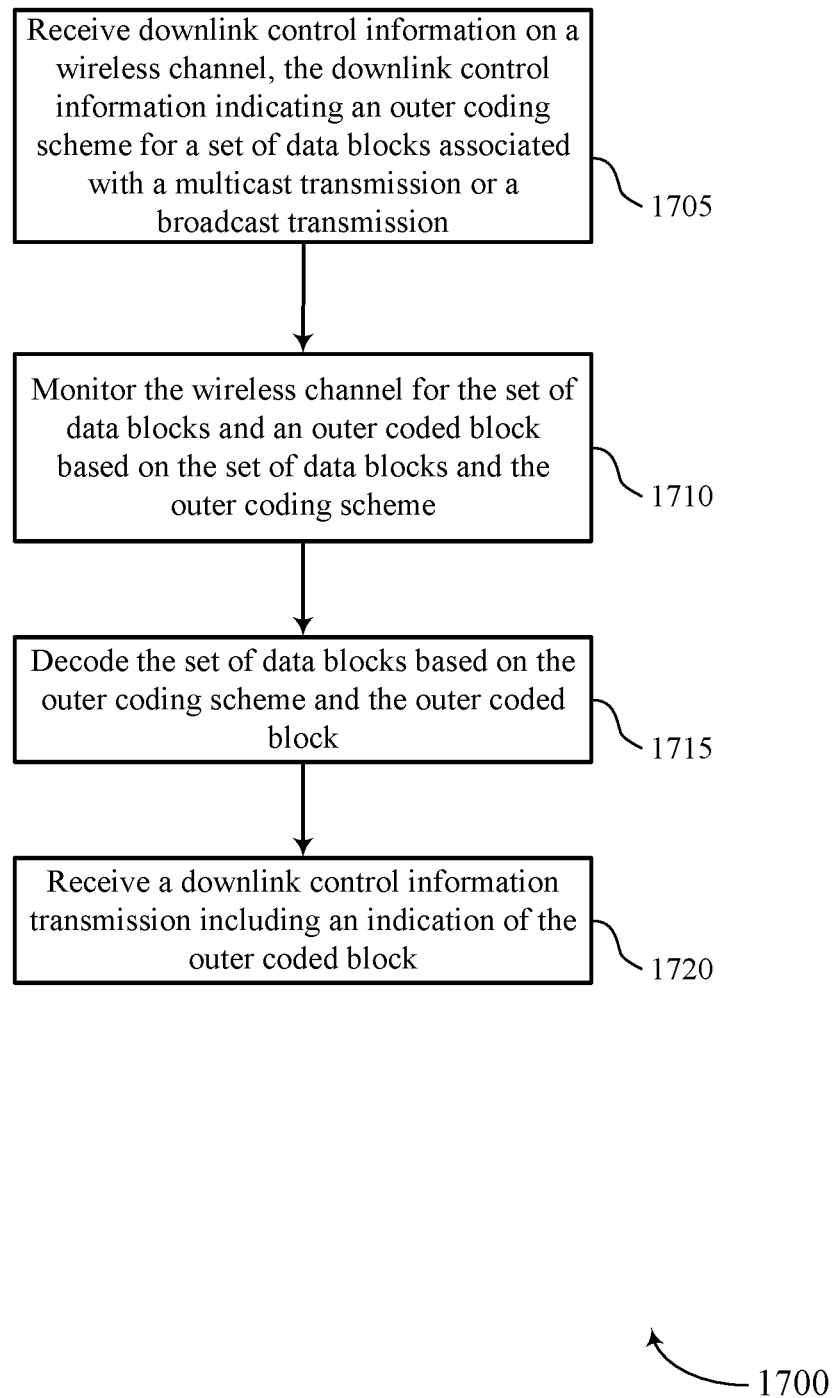

FIG. 17 shows a flowchart illustrating a method 1700 that supports outer coding schemes in downlink control information in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive downlink control information on a wireless channel, the downlink control information indicating an outer coding scheme for a set of data blocks associated with a multicast transmission or a broadcast transmission. The operations of 1705 may be performed according to the methods described herein. In some examples, aspects of the operations of 1705 may be performed by a DCI receiver as described with reference to FIGS. 6 through 9.

At 1710, the UE may monitor the wireless channel for the set of data blocks and an outer coded block based on the set of data blocks and the outer coding scheme. The operations of 1710 may be performed according to the methods described herein. In some examples, aspects of the operations of 1710 may be performed by a data block monitor component as described with reference to FIGS. 6 through 9.

At 1715, the UE may decode the set of data blocks based on the outer coding scheme and the outer coded block. The operations of 1715 may be performed according to the methods described herein. In some examples, aspects of the operations of 1715 may be performed by a data block decoder as described with reference to FIGS. 6 through 9.

At 1720, the UE may receive a downlink control information transmission including an indication of the outer coded block. The operations of 1720 may be performed according to the methods described herein. In some examples, aspects of the operations of 1720 may be performed by a DCI receiver as described with reference to FIGS. 6 through 9.

Figure 18:
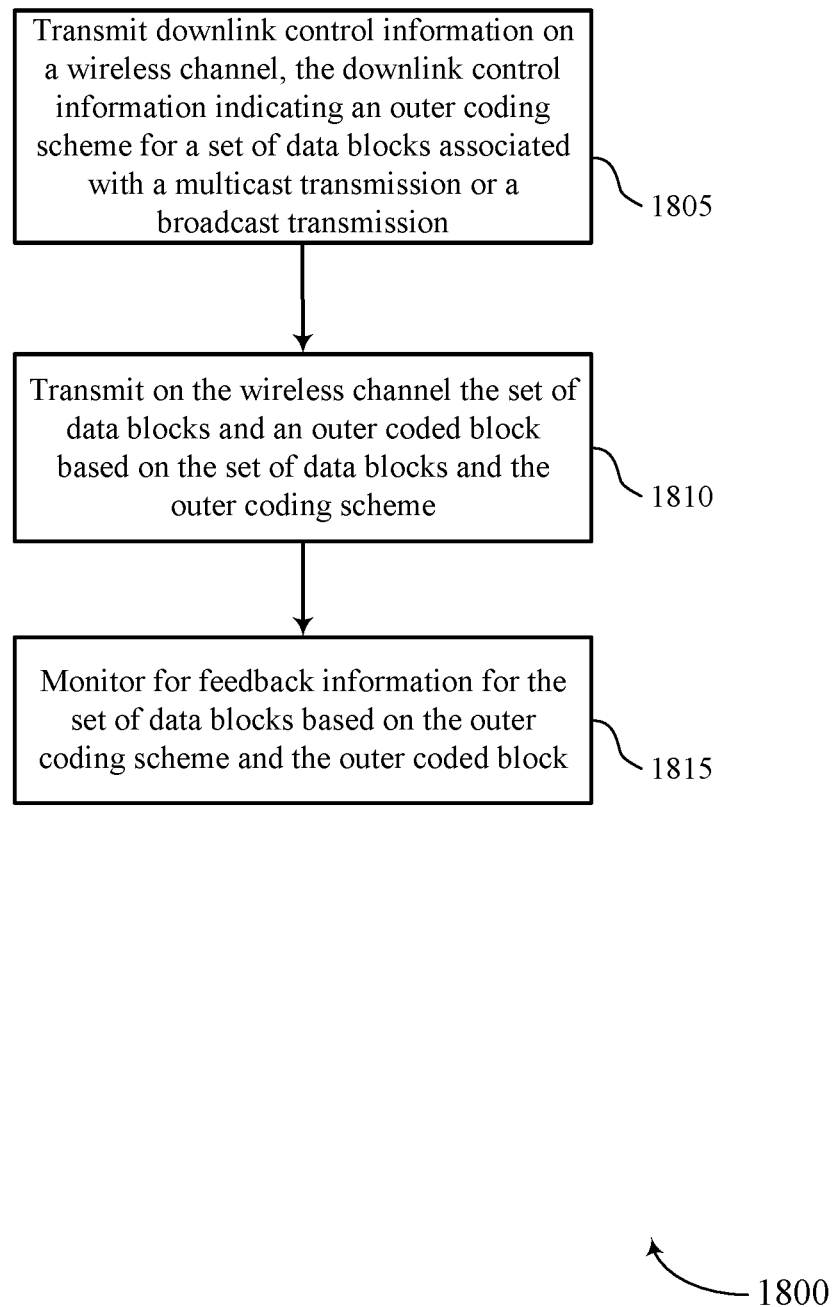

FIG. 18 shows a flowchart illustrating a method 1800 that supports outer coding schemes in downlink control information in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit downlink control information on a wireless channel, the downlink control information indicating an outer coding scheme for a set of data blocks associated with a multicast transmission or a broadcast transmission. The operations of 1805 may be performed according to the methods described herein. In some examples, aspects of the operations of 1805 may be performed by a DCI transmitter as described with reference to FIGS. 10 through 13.

At 1810, the base station may transmit on the wireless channel the set of data blocks and an outer coded block based on the set of data blocks and the outer coding scheme. The operations of 1810 may be performed according to the methods described herein. In some examples, aspects of the operations of 1810 may be performed by a data block transmitter as described with reference to FIGS. 10 through 13.

At 1815, the base station may monitor for feedback information for the set of data blocks based on the outer coding scheme and the outer coded block. The operations of 1815 may be performed according to the methods described herein. In some examples, aspects of the operations of 1815 may be performed by an outer coding procedure component as described with reference to FIGS. 10 through 13.

Figure 19:
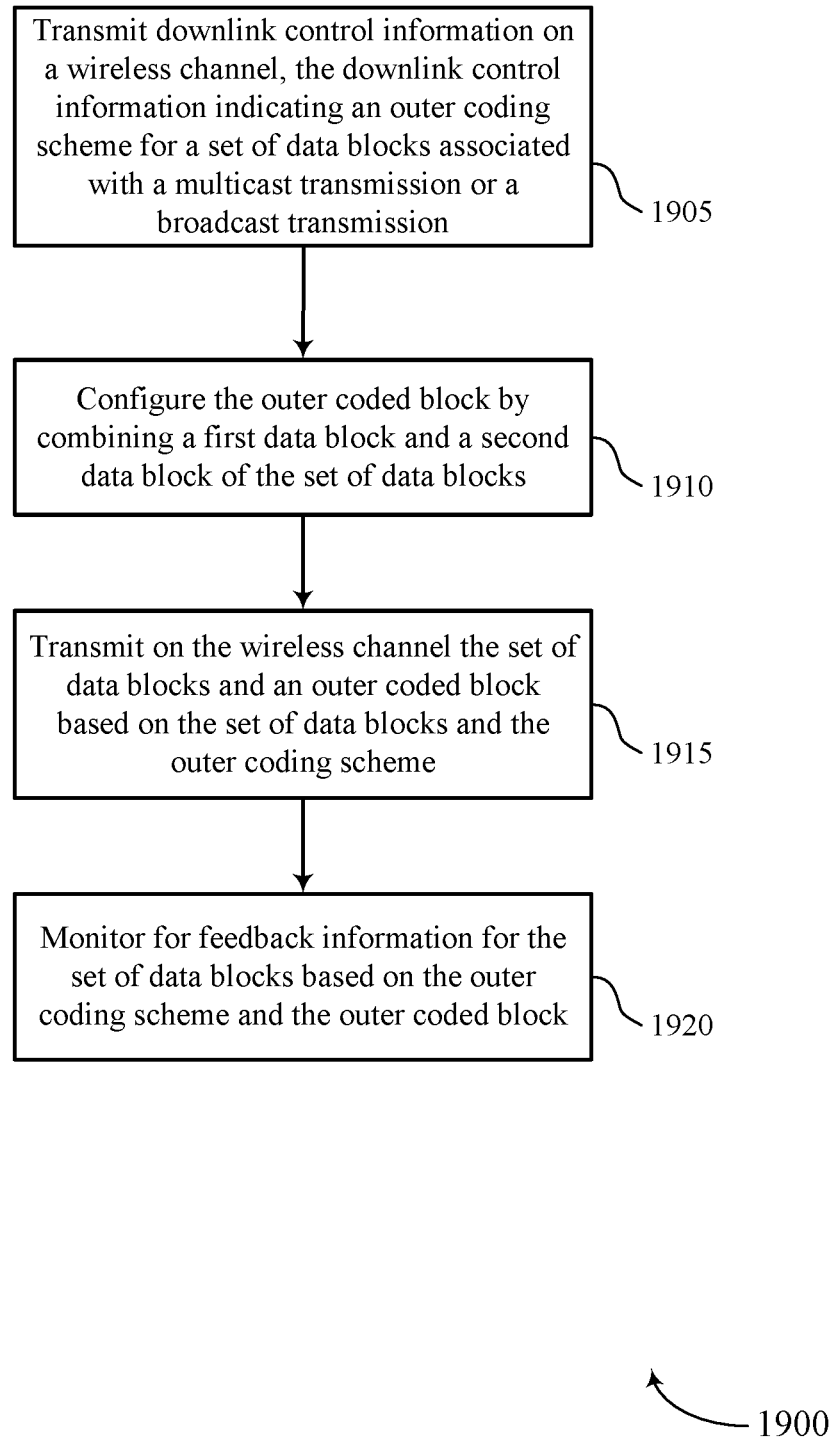

FIG. 19 shows a flowchart illustrating a method 1900 that supports outer coding schemes in downlink control information in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit downlink control information on a wireless channel, the downlink control information indicating an outer coding scheme for a set of data blocks associated with a multicast transmission or a broadcast transmission. The operations of 1905 may be performed according to the methods described herein. In some examples, aspects of the operations of 1905 may be performed by a DCI transmitter as described with reference to FIGS. 10 through 13.

At 1910, the base station may configure the outer coded block by combining a first data block and a second data block of the set of data blocks. The operations of 1910 may be performed according to the methods described herein. In some examples, aspects of the operations of 1910 may be performed by an outer coding block configuring component as described with reference to FIGS. 10 through 13.

At 1915, the base station may transmit on the wireless channel the set of data blocks and an outer coded block based on the set of data blocks and the outer coding scheme. The operations of 1915 may be performed according to the methods described herein. In some examples, aspects of the operations of 1915 may be performed by a data block transmitter as described with reference to FIGS. 10 through 13.

At 1920, the base station may monitor for feedback information for the set of data blocks based on the outer coding scheme and the outer coded block. The operations of 1920 may be performed according to the methods described herein. In some examples, aspects of the operations of 1920 may be performed by an outer coding procedure component as described with reference to FIGS. 10 through 13.

Figure 20:
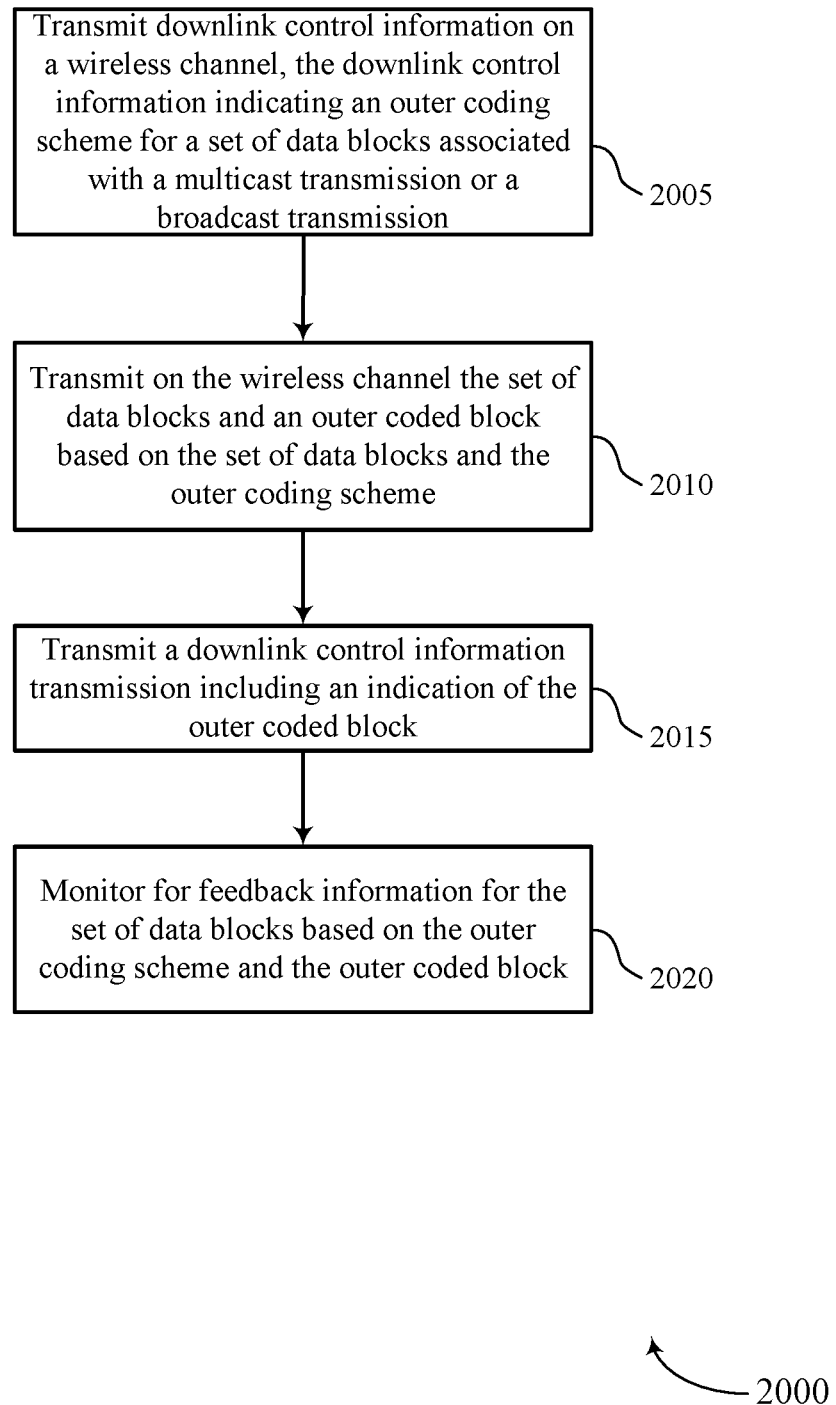

FIG. 20 shows a flowchart illustrating a method 2000 that supports outer coding schemes in downlink control information in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit downlink control information on a wireless channel, the downlink control information indicating an outer coding scheme for a set of data blocks associated with a multicast transmission or a broadcast transmission. The operations of 2005 may be performed according to the methods described herein. In some examples, aspects of the operations of 2005 may be performed by a DCI transmitter as described with reference to FIGS. 10 through 13.

At 2010, the base station may transmit on the wireless channel the set of data blocks and an outer coded block based on the set of data blocks and the outer coding scheme. The operations of 2010 may be performed according to the methods described herein. In some examples, aspects of the operations of 2010 may be performed by a data block transmitter as described with reference to FIGS. 10 through 13.

At 2015, the base station may transmit a downlink control information transmission including an indication of the outer coded block. The operations of 2015 may be performed according to the methods described herein. In some examples, aspects of the operations of 2015 may be performed by a DCI transmitter as described with reference to FIGS. 10 through 13.

At 2020, the base station may monitor for feedback information for the set of data blocks based on the outer coding scheme and the outer coded block. The operations of 2020 may be performed according to the methods described herein. In some examples, aspects of the operations of 2020 may be performed by an outer coding procedure component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The following provides an overview of examples of the present disclosure:

Example 1

A method of wireless communication at a user equipment (UE), comprising: receiving downlink control information on a wireless channel, the downlink control information indicating an outer coding scheme for a plurality of data blocks associated with a multicast transmission or a broadcast transmission; monitoring the wireless channel for the plurality of data blocks and an outer coded block based on the plurality of data blocks and the outer coding scheme; and decoding the plurality of data blocks based at least in part on the outer coding scheme and the outer coded block.

Example 2

The method of example 1, wherein decoding the plurality of data blocks further comprises: decoding the outer coded block and a first data block of the plurality of data blocks; performing, based at least in part on a success of decoding the outer coded block and the first data block, an outer decoding procedure for a second data block of the plurality of data blocks using the outer coded block and the first data block.

Example 3

The method of any of examples 1 or 2, wherein performing the outer decoding procedure for the second data block is further based at least in part on a determination that an initial decoding of the second data block was unsuccessful.

Example 4

The method of any of examples 1 to 3, wherein performing the outer decoding procedure for the second data block comprises: removing one or more padding bits from the combination of the outer coded block and the first data block.

Example 5

The method of any of examples 1 to 4, wherein performing the outer decoding procedure for the second data block comprises: combining a log-likelihood ratio of the outer coded block with a log-likelihood ratio of the first data block to obtain a log-likelihood ratio of the second data block; and decoding the second data block based at least in part on the combining.

Example 6

The method of any of examples 1 to 5, wherein performing the outer decoding procedure for the second data block comprises: combining the decoded outer coded block with the decoded first data block to obtain the second data block.

Example 7

The method of any of examples 1 to 6, further comprising: transmitting an acknowledgement message or a negative acknowledgment message based at least in part on a success of the outer decoding procedure.

Example 8

The method of any of examples 1 to 7, wherein each data block of the plurality of data blocks comprises one or more of: a transport block, a code block, or a code block group.

Example 9

The method of any of examples 1 to 8, wherein the first data block and the second data block are code blocks or code block groups from a same transport block.

Example 10

The method of any of examples 1 to 9, wherein the first data block and the second data block are code blocks or code block groups from different transport blocks.

Example 11

The method of any of examples 1 to 10, wherein the first data block and the second data block are code blocks from a different transport block.

Example 12

The method of any of examples 1 to 11, further comprising: receiving a downlink control information transmission comprising an indication of the outer coded block.

Example 13

The method of any of examples 1 to 12, wherein the indication of the outer coded block comprises one or more of: a hybrid automatic repeat request process identifier indicating the outer coded block; a redundancy version identifier indicating the outer coded block; code block group transmission information indicating the outer coded block; or a dedicated field indicating the outer coded block.

Example 14

The method of any of examples 1 to 13, further comprising: receiving a radio resource control message configuring a format for indicating the outer coded block in the downlink control information; and identifying the outer coded block based at least in part on the radio resource control message and the downlink control information.

Example 15

The method of any of examples 1 to 14, further comprising: transmitting a UE capability message indicating support for outer coding by the UE.

Example 16

A method for wireless communications at a second wireless device, comprising: transmitting downlink control information on a wireless channel, the downlink control information indicating an outer coding scheme for a plurality of data blocks associated with a multicast transmission or a broadcast transmission; transmitting on the wireless channel the plurality of data blocks and an outer coded block based on the plurality of data blocks and the outer coding scheme; and monitoring for feedback information for the plurality of data blocks based at least in part on the outer coding scheme and the outer coded block.

Example 17

The method of example 16, further comprising: configuring the outer coded block by combining a first data block and a second data block of the plurality of data blocks.

Example 18

The method of any one of examples 16 or 17, wherein configuring the outer coded block further comprises: combining a rate matched encoded version of the first data block with a rate matched encoded version of the second data block to obtain a rate matched encoded version of the outer coded block.

Example 19

The method of any one of examples 16 through 18, wherein a cyclic redundancy check of the plurality of data blocks is added per source of the plurality of data blocks and coded.

Example 20

The method of any one of examples 16 through 19, further comprising: receiving an acknowledgement message or a negative acknowledgment message based at least in part on a success of the outer decoding procedure.

Example 21

The method of any one of examples 16 through 20, further comprising: transmitting a downlink control information transmission comprising an indication of the outer coded block.

Example 22

The method of any one of examples 16 through 21, wherein the indication of the outer coded block comprises one or more of: a hybrid automatic repeat request process identifier indicating the outer coded block; a redundancy version identifier indicating the outer coded block; code block group transmission information indicating the outer coded block; or a dedicated field indicating the outer coded block.

Example 23

The method of any one of examples 16 through 22, further comprising: transmitting a radio resource control message configuring a format for indicating the outer coded block in the downlink control information.

Example 24

The method of any one of examples 16 through 23, further comprising: receiving a user equipment (UE) capability message indicating support for outer coding by the UE.

Example 25

The method of any one of examples 16 through 24, wherein the capability message comprises one or more of: an indication of the support for outer coding per component carrier of a plurality of component carriers; or an indication of the support for outer coding of one or more data rates for outer coding or non-outer coding.

Example 26

The method of any one of examples 16 through 25, wherein receiving the capability message further comprises: identifying the UE as part of a grouping of a plurality of UEs based at least in part on the support for outer coding by the UE; and transmitting a multicast signal to the grouping of the plurality of UEs.

Example 27

The method of any one of examples 16 through 26, wherein receiving the capability message further comprises: transmitting the multicast signal to one or more UEs not indicating support for outer coding.

Example 28

An apparatus for wireless communication comprising at least one means for performing a method of any one of examples 1 through 15.

Example 29

An apparatus for wireless communication comprising a processor, memory coupled with the processor, and instructions stored in the memory and executable by the processor to cause the apparatus to perform a method of any one of examples 1 through 15.

Example 30

A non-transitory computer-readable medium storing code for wireless communication comprising a processor, memory coupled with the processor, and instructions stored in the memory and executable by the processor to cause the apparatus to perform a method of any one of examples 1 through 15.

Example 31

An apparatus for wireless communication comprising at least one means for performing a method of any one of examples 16 through 27.

Example 32

An apparatus for wireless communication comprising a processor, memory coupled with the processor, and instructions stored in the memory and executable by the processor to cause the apparatus to perform a method of any one of examples 16 through 27.

Example 33

A non-transitory computer-readable medium storing code for wireless communication comprising a processor, memory coupled with the processor, and instructions stored in the memory and executable by the processor to cause the apparatus to perform a method of any one of examples 16 through 27.

What is claimed is:

1. A method of wireless communication at a user equipment (UE), comprising:
 receiving downlink control information on a wireless channel, the downlink control information identifying an outer coded block and a plurality of data blocks associated with a multicast transmission or a broadcast transmission and indicating an outer coding scheme for the plurality of data blocks associated with the multicast transmission or the broadcast transmission;
 monitoring the wireless channel for the plurality of data blocks and the outer coded block based on the identification of the outer coded block and the plurality of data blocks and the outer coding scheme; and
 decoding the plurality of data blocks based at least in part on the outer coding scheme and the outer coded block.

2. The method of claim 1, wherein decoding the plurality of data blocks further comprises:
 decoding the outer coded block and a first data block of the plurality of data blocks; and
 performing, based at least in part on a success of decoding the outer coded block and the first data block, an outer decoding procedure for a second data block of the plurality of data blocks using the outer coded block and the first data block.

3. The method of claim 2, wherein:
 performing the outer decoding procedure for the second data block is further based at least in part on a determination that an initial decoding of the second data block was unsuccessful.

4. The method of claim 2, wherein performing the outer decoding procedure for the second data block comprises:
 removing one or more padding bits from a combination of the outer coded block and the first data block.

5. The method of claim 2, wherein performing the outer decoding procedure for the second data block comprises:
 combining a log-likelihood ratio of the outer coded block with a log-likelihood ratio of the first data block to obtain a log-likelihood ratio of the second data block; and
 decoding the second data block based at least in part on the combining.

6. The method of claim 2, wherein performing the outer decoding procedure for the second data block comprises:
 combining the decoded outer coded block with the decoded first data block to obtain the second data block.

7. The method of claim 2, further comprising:
 transmitting an acknowledgement message or a negative acknowledgment message based at least in part on a success of the outer decoding procedure.

8. The method of claim 2, wherein each data block of the plurality of data blocks comprises one or more of: a transport block (TB), a code block (CB), or a CB group (CBG).

9. The method of claim 8, wherein the first data block and the second data block are CBs or CB groups from a same TB.

10. The method of claim 8, wherein the first data block and the second data block are CBs or CB groups from different TBs.

11. The method of claim 8, wherein the first data block and the second data block are CBs from a different TB.

12. The method of claim 1, further comprising:
 receiving a downlink control information transmission comprising an indication of the outer coded block.

13. The method of claim 12, wherein the indication of the outer coded block comprises one or more of:
 a hybrid automatic repeat request process identifier indicating the outer coded block;
 a redundancy version identifier indicating the outer coded block;
 CB group transmission information indicating the outer coded block; or; and
 a dedicated field indicating the outer coded block.

14. The method of claim 12, further comprising:
 receiving a radio resource control message configuring a format for indicating the outer coded block in the downlink control information; and
 identifying the outer coded block based at least in part on the radio resource control message and the downlink control information.

15. The method of claim 1, further comprising:
 transmitting a UE capability message indicating support for outer coding by the UE.

16. A method for wireless communications at a network entity, comprising:
 transmitting downlink control information on a wireless channel, the downlink control information identifying an outer coded block and a plurality of data blocks associated with a multicast transmission or a broadcast transmission and indicating an outer coding scheme for the plurality of data blocks associated with the multicast transmission or the broadcast transmission;
 transmitting on the wireless channel the plurality of data blocks and the outer coded block based on the identification of the outer coded block and the plurality of data blocks and the outer coding scheme; and
 monitoring for feedback information for the plurality of data blocks based at least in part on the outer coding scheme and the outer coded block.

17. The method of claim 16, further comprising:
 configuring the outer coded block by combining a first data block and a second data block of the plurality of data blocks.

18. The method of claim 17, wherein configuring the outer coded block further comprises:
 combining a rate matched encoded version of the first data block with a rate matched encoded version of the second data block to obtain a rate matched encoded version of the outer coded block.

19. The method of claim 17, wherein a cyclic redundancy check of the plurality of data blocks is added per source of the plurality of data blocks and coded.

20. The method of claim 16, wherein monitoring for feedback information for the plurality of data blocks comprises:
 receiving an acknowledgement message or a negative acknowledgment message based at least in part on a success of an outer decoding procedure based on the outer coding scheme.

21. The method of claim 16, further comprising:
 transmitting a downlink control information transmission comprising an indication of the outer coded block.

22. The method of claim 21, wherein the indication of the outer coded block comprises one or more of:
 a hybrid automatic repeat request process identifier indicating the outer coded block;
 a redundancy version identifier indicating the outer coded block;
 CB group transmission information indicating the outer coded block; or; and
 a dedicated field indicating the outer coded block.

23. The method of claim 21, further comprising:
transmitting a radio resource control message configuring a format for indicating the outer coded block in the downlink control information.

24. The method of claim 16, further comprising:
receiving a user equipment (UE) capability message indicating support for outer coding by the UE.

25. The method of claim 24, wherein the UE capability message comprises one or more of:
an indication of the support for outer coding per component carrier of a plurality of component carriers; or; and
an indication of the support for outer coding of one or more data rates for outer coding or non-outer coding.

26. The method of claim 24, wherein receiving the UE capability message further comprises:
identifying the UE as part of a grouping of a plurality of UEs based at least in part on the support for outer coding by the UE; and
transmitting a multicast signal to the grouping of the plurality of UEs.

27. The method of claim 26, further comprising:
transmitting the multicast signal to one or more UEs not indicating support for outer coding.

28. An apparatus for wireless communication at a user equipment (UE), comprising:
a processor; and
a memory coupled with the processor, with instructions stored in the memory, the instructions being executable by the processor to cause the apparatus to:
receive downlink control information on a wireless channel, the downlink control information identifying an outer coded block and a plurality of data blocks associated with a multicast transmission or a broadcast transmission and indicating an outer coding scheme for the plurality of data blocks associated with the multicast transmission or the broadcast transmission;
monitor the wireless channel for the plurality of data blocks and the outer coded block based on the identification of the outer coded block and the plurality of data blocks and the outer coding scheme; and
decode the plurality of data blocks based at least in part on the outer coding scheme and the outer coded block.

29. An apparatus for wireless communications at a network entity, comprising:
a processor; and
a memory coupled with the processor, with instructions stored in the memory, the instructions being executable by the processor to cause the apparatus to:
transmit downlink control information on a wireless channel, the downlink control information identifying an outer coded block and a plurality of data blocks associated with a multicast transmission or a broadcast transmission and indicating an outer coding scheme for the plurality of data blocks associated with the multicast transmission or the broadcast transmission;
transmit on the wireless channel the plurality of data blocks and the outer coded block based on the identification of the outer coded block and the plurality of data blocks and the outer coding scheme; and
monitor for feedback information for the plurality of data blocks based at least in part on the outer coding scheme and the outer coded block.

* * * * *